(12) United States Patent
Nagabhushan et al.

(10) Patent No.: US 9,199,746 B2
(45) Date of Patent: Dec. 1, 2015

(54) ATTITUDE CONTROL SYSTEM FOR SMALL SATELLITES

(75) Inventors: Vivek Nagabhushan, Phoenix, AZ (US); Norman G. Fitz-Coy, Gainesville, FL (US); Frederick Aaron Leve, Albuquerque, NM (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 150 days.

(21) Appl. No.: 13/321,086

(22) PCT Filed: May 19, 2010

(86) PCT No.: PCT/US2010/035397
§ 371 (c)(1),
(2), (4) Date: Mar. 27, 2012

(87) PCT Pub. No.: WO2010/135421
PCT Pub. Date: Nov. 25, 2010

(65) Prior Publication Data
US 2012/0199697 A1    Aug. 9, 2012

Related U.S. Application Data

(60) Provisional application No. 61/179,494, filed on May 19, 2009.

(51) Int. Cl.
*B64G 1/28*    (2006.01)
*B64G 1/42*    (2006.01)

(52) U.S. Cl.
CPC ............... *B64G 1/286* (2013.01); *B64G 1/428* (2013.01); *Y10T 74/1282* (2015.01)

(58) Field of Classification Search
CPC .......................................................... B64G 1/283
USPC ..................................... 244/165, 164; 701/13
See application file for complete search history.

(56) References Cited

U.S. PATENT DOCUMENTS

| | | | |
|---|---|---|---|
| 3,452,948 A * | 7/1969 | Chang et al. .................. | 244/165 |
| 3,582,016 A | 6/1971 | Sherman | |
| 3,741,500 A * | 6/1973 | Liden ............................ | 244/165 |
| 4,125,017 A * | 11/1978 | Dhuyvetter et al. ........ | 73/178 R |
| 4,825,716 A * | 5/1989 | Roberts et al. ................ | 74/5.34 |
| 6,039,290 A * | 3/2000 | Wie et al. ..................... | 244/165 |
| 6,286,787 B1 | 9/2001 | Fleeter | |
| 6,305,647 B1 | 10/2001 | Defendini et al. | |

(Continued)

OTHER PUBLICATIONS

Alminde, L., et al., *The AAU-Cubesat Student Satellite Project: Architectural Overview and Lessons Learned*, 16th IFAC Symposium on Automatic Control in Aerospace, Russia (2004), 6 pages.

(Continued)

*Primary Examiner* — Brian M O'Hara
*Assistant Examiner* — Jessica Wong
(74) *Attorney, Agent, or Firm* — Alston & Bird LLP

(57) ABSTRACT

Various embodiments of the present invention include an attitude control system for use with small satellites. According to various embodiments, the system allows rapid retargeting (e.g., high slew rates) and full three-axis attitude control of small satellites using a compact actuation system. In certain embodiments, the compact actuation system includes a plurality of single-gimbaled control moment gyroscopes (SGCMG) arranged in a pyramidal configuration that are disposed within a small satellite.

18 Claims, 25 Drawing Sheets

(56) References Cited

U.S. PATENT DOCUMENTS

| | | | |
|---|---|---|---|
| 6,499,699 B1* | 12/2002 | Salenc et al. | 244/165 |
| 6,648,274 B1 | 11/2003 | Bailey et al. | |
| 6,917,862 B2 | 7/2005 | Wie | |
| 7,044,245 B2 | 5/2006 | Anhalt et al. | |
| 7,171,290 B2 | 1/2007 | Lagadec et al. | |
| 2002/0153455 A1 | 10/2002 | Hall | |
| 2004/0111194 A1* | 6/2004 | Wie | 701/13 |
| 2006/0032985 A1* | 2/2006 | Smith et al. | 244/165 |
| 2006/0151671 A1 | 7/2006 | Kosmas | |
| 2008/0223990 A1* | 9/2008 | Jackson et al. | 244/165 |
| 2009/0108136 A1* | 4/2009 | Suzuki | 244/165 |

OTHER PUBLICATIONS

Baker, K. et al., *Space Satellites From the World's Garage—the Story of AMSAT*, Proceedings of the IEEE 1994 National Aerospace and Electronics Conference (1994) 1174-1181.

Kurukowa, H., *A Geometric Study of Single Gimbal Control Moment Gyros*, PhD Thesis, University of Tokyo. (1998).

Lan, W., *Poly Picosatellite Orbital Deployer Mk III ICD*, tech. rep., California Polytechnic State University (2007).

Lappas, V. et al., *Attitude control for Small Satellites Using control Moment Gyros*, Acta Astronautica, vol. 51, Issues 1-9, Jul.-Nov. 2002, 7 pages.

Lappas, V. J. et al., *Practical Results on the Development of a Control Moment Gyro Based Attitude Control System for Agile Small Satellites*, The Sixteenth Annual AIAA/USU Conference on Small Satellites, Aug. 12-15, 2002, Logan, Utah, USA.

Larsen, B. et al., *Microcontroller Design for the Montana EaRth Orbiting Pico-Explorer (MEROPE) Cubesat-class Satellite*, Aerospace Conference Proceedings, vol. 1 (2002).

Leve, F. et al., *A Scalable Control Moment Gyro Design for Attitude Control of Micro-, Nano-, and Pico-Class Satellites*, American Astronautical Society AAS 07-041, Feb. 2007, 12 pages.

Leve, F. et al., *Three-Axis Attitude Control Design for On-Orbit Robotics*, American Institute of Aeronautics and Astronautics, Inc. (2007) 10 pages.

Long, M. et al., *A Cubsat Derived Design for a Unique Academic Research Mission in Earthquake Signature Detection*, AIAA Small Satellite Conference (2003) 1-17.

Margulies, G. et al., *Geometric Theory of Single-Gimbal Control Moment Gyro Systems*, Journal of the Astronautical Sciences, vol. 26, No. 2, (1978) 159-191.

Nagabhushan, V., *Development of Control Moment Gyroscopies for Attitude Control of Small Satellites*, Master's Thesis, University of Florida (2009) 1-98.

Nagabhushan, V. et al., *Split Flywheel Design With Attitude Jitter Minimization Through Flywheel Phase Control*, AIAA@Infotech, Seattle (2009) 1-13.

Svartveit, K., *Attitude Determination of the NCUBE Satellite*, tech. rep., Department of Engineering Cybernetics—Norwegian University of Science and Technology (2003).

Waydo et al., *CubeSat Design for LEO-based Earth Science Missions*, Aerospace Conference Proceedings, vol. 1 (2002).

Wie, B. et al., *Quaternion Feedback Regulator for Spacecraft Eigenaxis Rotations*, Journal of Guidance, Control, Dynamics, vol. 12, No. 3 (1989) 375-380.

Wie, B. et al., *Singularity Robust Steering Logic for Redundant Single-Gimbal Control Moment Gyros*, Journal of Guidance, Control, Dynamics, vol. 24, No. 5 (2001) 865-872.

ASTREC Advance Space Technologies Research & Engineering Center, IAB Meeting, Nov. 18-19, 2008, Gainesville, FL.

International Search Report for Application No. PCT/US2010/035397 dated Jan. 6, 2011.

Slew rate [online] [retrieved Apr. 29, 2010]. Retrieved from the Internet: <URL: http://en.wikipedia.org/wiki/Slew-rate>. (undated) 2 pages.

What Is a CubeSat? [online] [retrieved Dec. 30, 2014]. Retrieved from the Internet: <URL: http://www.lunarsail.com/what-is-a-cubesat/>. (undated) 4 pages.

International Report on Patentability/Written Opinion for Application No. PCT/US2010/035397 dated Nov. 22, 2011.

* cited by examiner

| PARAMETER | VALUE |
|---|---|
| FLYWHEEL INERTIA - $I^f_{xx}$ | $0.8\ Kgmm^2$ |
| GIMBAL INERTIA - $I^g_{zz}$ | $1\ Kgmm^2$ |
| FLYWHEEL ANGULAR VELOCITY - $\omega_x$ | $4500\ rpm$ |
| FLYWHEEL ANGULAR ACCELERATION - $\dot{\omega}_x$ | $0\ rad/s^2$ |
| GIMBAL ANGULAR VELOCITY - $\dot{\delta}$ | $1\ rad/s$ |
| GIMBAL ANGULAR ACCELERATION - $\ddot{\delta}$ | $0\ rad/s^2$ |
| GIMBAL INCLINATION - $\phi$ | $40°$ |

FIG. 42

| SUBSYSTEM | ITEM | QUANTITY | UNIT MASS (kg) | MASS (kg) |
|---|---|---|---|---|
| CMG | L BRACKET | 4 | 0.007 | 0.028 |
| | GIMBAL HOUSING | 4 | 0.013 | 0.052 |
| | M-WHEEL HOUSING | 4 | 0.0132 | 0.0527 |
| | FLYWHEEL | 4 | 0.0045 | 0.0182 |
| | BUSH | 8 | 0.001 | 0.008 |
| | BEARING - BIG | 4 | 0.0074 | 0.0296 |
| | BEARING - SMALL | 4 | 0.002 | 0.008 |
| | SLIPRING | 4 | 0.002 | 0.008 |
| | DRIVER BOARDS | 4 | 0.01 | 0.04 |
| | MOTORS | 8 | 0.031 | 0.248 |
| ADS | IMU | 1 | 0.016 | 0.016 |
| | MAGNETOMETER | 1 | 0.005 | 0.005 |
| COMMS | STENSAT | 1 | 0.071 | 0.071 |
| | ANTENNA | 1 | 0.01 | 0.01 |
| EPS | SOLAR CELLS | 4 | 0 | 0.028 |
| | EPS BOARD | 1 | 0.15 | 0.145 |
| | BATTERIES | 1 | INCLUDED ABOVE | 0 |
| CDH | FM430 | 1 | 0.074 | 0.074 |
| STRUCTURES | CUBE FRAME | 1 | 0.15 | 0.1 |
| MISCELLANEOUS | MECHANICAL HARDWARE | | 0.01 | 0.01 |
| | ELECTRICAL HARDWARE | | 0.01 | 0.01 |
| TOTAL | | | | 0.961 |

FIG. 43

| ITEM | QUANTITY | UNIT MASS (g) | MASS (g) |
|---|---|---|---|
| L. BRACKET | 4 | 8 | 32 |
| GIMBAL HOUSING | 4 | 10 | 40 |
| FLYWHEEL HOUSING | 4 | 15 | 60 |
| FLYWHEEL | 4 | 15 | 60 |
| BEARING - 618/7-H | 8 | 2 | 16 |
| BEARING - 61802 | 4 | 7.4 | 29.6 |
| BEARING - 6186-H | 4 | 2 | 8 |
| SNAPRING(CFH-24) | 4 | 0.2 | 0.8 |
| SNAPRING(CFH-22) | 4 | 0.2 | 0.8 |
| SNAPRING(CFS-6) | 4 | 0.1 | 0.4 |
| INDUCTIVE SENSOR | 4 | 5 | 20 |
| SLIPRING | 4 | 2 | 8 |
| MOTOR DRIVER | 1 | 65 | 65 |
| MOTORS | 8 | 30 | 240 |
| TOTAL | | | 580.600 |

FIG. 44

| ITEM | QUANTITY | ESTIMATED UNIT MASS (g) | ACTUAL UNIT MASS (g) | ESTIMATED MASS (g) (S) | ACTUAL MASS (g) (S) |
|---|---|---|---|---|---|
| L. BRACKET | 4 | 8 | 8.2 | 32 | 32.8 |
| GIMBAL MOTOR HOUSING | 4 | 5 | 4.9 | 20 | 19.6 |
| FLYWHEEL HOUSING | 4 | 12 | 12.3 | 48 | 49.2 |
| FLYWHEEL | 4 | 15 | 15 | 60 | 60 |
| BEARING - 618/6-H | 8 | 2 | 2 | 16 | 16 |
| BEARING - 61801-H | 8 | 7.4 | 7.4 | 59.2 | 59.2 |
| SLIPRING | 4 | 2 | 2 | 8 | 8 |
| FLYWHEEL MOTOR DRIVER | 8 | 6 | 6.2 | 48 | 49.6 |
| GIMBAL MOTORS | 4 | 26 | 25.5 | 104 | 102 |
| FLYWHEEL MOTORS | 4 | 15 | 10.1 | 60 | 40.4 |
| TOTAL | | | | 455.200 | 436.800 |

FIG. 45

| PARAMETER | VALUE | UNITS |
|---|---|---|
| FLYWHEEL INERTIA | 0.8 | $kg \cdot mm^2$ |
| GIMBAL INERTIA | 10 | $kg \cdot mm^2$ |
| FLYWHEEL ANGULAR VELOCITY | 4500 | $rpm$ |
| MAXIMUM GIMBAL ACCELERATION | 24 | $rad/s^2$ |
| MAXIMUM GIMBAL RATE | 1.57 | $rad/s$ |
| GIMBAL INCLINATION | 40° | |
| QUATERNION GAIN | 95.4 | $s^{-2}$ |
| ANGULAR VELOCITY GAIN | 55.0 | $s^{-1}$ |
| INITIAL QUATERNION | $[-1/\sqrt{2} \quad 0 \quad 0 \quad 1/\sqrt{2}]^T$ | |
| INITIAL ANGULAR VELOCITY | $[.01 \quad .01 \quad 0]^T$ | $rad/s$ |

FIG. 46

| PARAMETER | VALUE |
|---|---|
| SEMIMAJOR AXIS - $a$ | 7078 km |
| ECCENTRICITY - $e$ | .014128 |
| RAAN - $\Omega$ | 334.849° |
| INCLINATION - $i$ | 97.973° |
| ARGUMENT OF PERIGEE - $\omega$ | 14.943° |
| INITIAL TRUE ANOMOLY - $f_o$ | 0 |

FIG. 47

ATTITUDE CONTROL SYSTEM FOR SMALL SATELLITES

CROSS REFERENCE TO RELATED APPLICATIONS

This application is a national stage application filed under 35 U.S.C. 371 of International Application No. PCT/US2010/035397, filed May 19, 2010, which claims priority from U.S. Provisional Application No. 61/179,494, filed May 19, 2009, each of which is incorporated herein in its entirety.

FIELD OF THE INVENTION

Embodiments of the present invention relate to satellites and, more particularly, to systems and methods for attitude control of pico- and nano-satellites.

BACKGROUND

During the past decade there has been growing interest within the space industry towards the development of small satellites. Small satellites are typically categorized as picosats (1 kg or less), nanosats (1-10 kg), microsats (10-100 kg) or minisats (100-500 kg) and range in size from softballs to refrigerators. The interest in these satellites is driven by the current constraints of traditional satellites and launch systems. As a result, there has been a significant effort to push satellite technology to smaller sizes and mass, which would enable small satellites to accomplish missions to complement the larger satellites. Examples of such missions include imaging, remote sensing, surveillance, disaster management, and blue force tracking. These missions are achieved by payloads which demand pointing capabilities from the satellites. This requires an attitude control system (ACS) with small actuators that can fit into the volume and mass constraints of small satellites.

Traditional satellites are typified by budgets in the millions or billions of dollars and schedules on the order of ten years. Failure of traditional satellites is extremely costly hence they tend to utilize space-proven, often outdated technologies, leaving very little room for innovation. An enormous amount of money and effort is expended into the development of redundant systems and the maintenance of outdated techniques and procedures. Thus historically, the development of traditional satellites has been limited to countries with large military and/or commercial budgets.

Small satellites provide an alternative. Improved technologies have allowed small satellites to accomplish many of the tasks of the larger predecessors and at a fraction of the cost and time required of a traditional space satellite [1]. As a result, risk aversion is reduced and small satellite developers are more willing to explore new, unproven technologies that may result in total mission cost reduction and/or increased functionality of the satellite. It should be noted that the willingness of small satellite developers to explore new technologies and innovative designs is not entirely by choice but by the constraints of reduced resources; i.e., "necessity is the mother of invention." This virtuous circle also has additional benefits in that small satellite developers are now leveraging technologies developed by other non-aerospace industries and are thus helping to underwrite the development cost, i.e., by utilizing commercial off-the-shelf (COTS) items, further cost reductions are being experienced in the space industry.

The advent of small satellites has made space much more accessible and as a result, there has been a large number of proposed (and in development) educational, research, and entrepreneurial satellite efforts [2], [3], [4], [5]. To further expedite the small satellite developmental cycle a standardized platform, known as the CubeSat, was developed [6]. CubeSats are in the picosat class and thus are limited to a mass of 1.3 kg and dimensions of a 10×10×10 cm cube. Multiple CubeSats can also be combined to form nanosats with mass constraints up to 4 kg and dimensions of up to 10×10×30 cm.

A review of the existing and proposed missions illustrates a deficiency in three-axis attitude control of the pico and nano-class satellites [7]. To date, these satellite classes typically use coarse three axis attitude control, or passive control that stabilizes the satellite but fails to provide pointing accuracy. Nadir pointing, when one end or face of the satellite is facing the earth, has been accomplished using either passive means—gravity gradient (e.g. ICE CUBE 1&2, SMART SAT) or magnetic torquers (e.g., DTU SAT, AAU SAT, CUTE 1.7). In cases which required three-axis attitude control, a combination of magnetic torquers (two axes) and a reaction wheel (one axis) have been employed. While these systems have provided some form of attitude control for their experimental mission, the real utility of pico- and nano-satellites cannot be fully realized with these systems.

Control of the angular motion of the spacecraft is inherently management of the vehicle's angular momentum. The angular momentum of the spacecraft can be manipulated by (i) application of an external torque or (ii) by redistribution of the angular momentum within the spacecraft. Both of these effects are captured by the following equation, wherein the latter case is represented by $\underline{\tau}_{ext}=0$.

$$\Sigma \underline{\tau}_{ext} = J\dot{\underline{\omega}} + \overline{\underline{\omega}} J \underline{\omega}$$

The two major components of the ACS are the actuator and the control algorithm. A brief description of the most common attitude actuation systems found in spacecraft applications is presented below. Various types of actuators include the reaction wheel, magnetic rods, torque coils, thrusters, momentum wheels and control moment gyroscope. There are four different types of actuators typically utilized in satellite attitude control. For small satellite (smallsat) mission applications, each of these actuator types has advantages and disadvantages which are discussed in the following paragraphs.

Reaction control devices use spatially distributed linear thrusters to generate external torque. Typically, the linear thrusters are either chemically based or electrically based. The chemically based thrusters utilize a chemical reaction which accelerates a propellant and expels it from the spacecraft. A variant of this system uses pressurized monopropellant to accomplish the same effect. Both of these systems have limited operational life since the momentum transfer is accomplished through expelled particles which must be stored onboard the spacecraft and once expelled are non-reusable. These systems require propellant storage, plumbing, and valves for operations which makes them impractical for pico-/nano-satellite applications. Additionally, these systems require multiple sets of actuators for rapid and precision attitude control.

The electrically based thrusters expel ionized particles accelerated by an electric field which make them more fuel-efficient than their chemical counterparts. Ion thrusters produce less thrust than chemical thrusters and have been implemented as a subset of multiple reaction control attitude actuators. In their current state of development, ion thrusters are impractical for three-axis attitude control due to volume and mass constraints. Furthermore, they may be incapable of performing rapid slew maneuvers due to their low thrust output.

Magnetic actuators usually include either permanent magnets (passive) or coils through which current flows in order to generate magnetic fields (i.e. local $\underline{B}\neq 0$). Magnet torquers generate external torques on the spacecraft by the interaction of the onboard field with the Earth's magnetic field. Since the external torque is a resultant of a vector cross product between the fields, full three axis control is not always possible. Magnet torquers are utilized by CubeSats for de-tumbling where as permanent magnets are typically used for nadir pointing missions. Magnet torquers are ideal for CubeSats since they contain no moving parts, require reasonable power and consume relatively low mass and volume. However, they suffer from (i) spatial dependence (i.e., require knowledge of the local magnetic field), (ii) relatively low accuracy, and (iii) singular directions potential attitudes for which magnetic coils become ineffective).

Momentum exchange devices include flywheels that are either spinning at high speeds (momentum wheels—MW), accelerated (reaction wheel—RW), or moderately spinning wheels that are gimbaled (control moment gyroscopes—CMG). All three systems are susceptible to momentum saturation (e.g., from external disturbances) and require some capabilities for momentum dumping. Typically, the momentum dumping is accomplished with either magnet torquers or reaction control devices.

Momentum wheels differ from reaction wheels in that RWs have a zero nominal operating speed. Reaction wheels as the name implies, produce a torque on the spacecraft in response to a torque applied by a motor to a flywheel. These devices are relatively simple in design but require substantial power (i.e., shaft power) due to the direct nature of the application of torque (i.e., the output to input torque ratio is unity) and typically have lower slew rates than CMGs. Combinations of RWs (typically one) and magnetic torquers have been implemented on nano-satellites for 3-axis attitude control.

CMGs rotate the angular momentum along a flywheel axis about a gimbal axis to produce a gyroscopic control torque as shown in FIG. 1. The output torque (gyroscopic torque) is amplified over the input torque required to rotate the gimbal axis (due to the satellite angular velocity) resulting in the well known torque amplification factor which allows for higher slew rates. This property of torque amplification as well as the fact that CMGs require minimal shaft power, permits the CMG to have a much higher torque per unit mass and unit power ratio than RWs.

More specifically, the CMG is a mechanism that produces torque by a combination of two motions—spinning a flywheel about an axis referred to as the flywheel axis and the rotation of the spinning flywheel about an axis perpendicular to flywheel axis referred to as the gimbal axis. The two main components of a gyroscope are the flywheel and the gimbal. The flywheel is a spinning rotor with inertia sufficient to provide the desired angular momentum; the gimbal is a pivot about which the flywheel assembly can be rotated. The magnitude of the gyroscopic torque produced is directly proportional to the inertia of the flywheel, the angular speed of the flywheel and the rate of rotation of the gimbal. In a CMG, the inertia of the flywheel and the speed of the flywheel are constant, and the torque output is controlled by changing the rotation rate of the gimbal. The direction of the torque produced is perpendicular to both the flywheel and the gimbal axes per the right hand rule. This torque acts on the satellite structure to change its attitude. A combination of gyroscopes is used to produce a net torque in the desired direction and magnitude. There are various combinations of gyroscopes that can be used depending upon the mission requirements (box configuration, inline configuration, roof top configuration, pyramidal configuration).

Apart from the gyroscopic torque produced by the CMG, there are other torques that arise from the motion of the flywheel and gimbal that contribute to the dynamics of the satellite:

Reaction torque due to friction in the flywheel bearings.

Reaction torque due to the acceleration of the gimbal; this torque depends on the angular acceleration and the inertia of the gimbal.

Reaction torque due to the friction of the gimbal bearings and slip ring.

The motion to the flywheel and gimbal is provided by flywheel and gimbal motors. There are feedback devices (e.g., encoders and Hall-effect sensors) for sensing the angular speed and position. A slip ring is provided for continuous power supply to the flywheel motor for endless rotation of the gimbal. All these hardware are assembled together with structural components.

The CMG shown in FIG. 1 is in its basic form and called the single gimbal control moment gyroscope (SGCMG). The torque output of this CMG is in a unique direction for every orientation of the gimbal and flywheel axis. The torque span of this type of CMG lies in a plane (for 360° rotation of the gimbal axis). The SGCMG is popular and widely used for its simplicity in mechanical construction and relatively simpler control logic.

The second type of CMG is the double gimbal control moment gyroscope (DGCMG). In this type there are two gimbals about which the flywheel assembly can rotate. The output torque direction of this CMG is determined by the angular positions of both the gimbals and since these gimbals are in two different orthogonal planes, the torque output is in 3D space and not confined to a plane as in a SGCMG. One of the drawbacks of this type is the phenomenon of gimbal lock which occurs when the flywheel and gimbal axes align. In this situation the CMG cannot produce any torque. The mechanical construction of the DGCMG is more complex.

Another type of CMG is the variable speed control moment gyroscope (VSCMG). This CMG controls the acceleration of the flywheel to produce torque in addition to the gyroscopic torque produced by gimbal movement. The output torque direction of this CMG is determined by the acceleration of the flywheel and the orientation of the gimbal. The torque span hence lies in 3D space. Two different control algorithms—one for the flywheel and the other for the gimbal needs to integrated for the functioning of the VSCMG.

Therefore, there exists a need for a CMG capable of rapid retargeting (e.g., high slew rates) and attitude control of small satellites (e.g., pico and nano-satellites) using a compact actuation system. Moreover, there is a need for a CMG meeting various size and performance constraints, such as mass, power, and volume constraints for these small satellites.

BRIEF SUMMARY OF THE INVENTION

Embodiments of the present invention are directed to CMGs capable of attitude control of small satellites (e.g., pico and nano-satellites) using a compact actuation system. In one embodiment, an attitude control system (ACS) for use with a pico- or a nano-satellite is provided and includes a plurality of single-gimbaled control moment gyroscopes (SGCMGs) arranged in a pyramidal configuration and operable to provide three-axis attitude control of the satellite, wherein the ACS occupies a volume of less than about 100 mm×100 mm×50 mm of the satellite and has a mass less than about 500 grams.

In one aspect, the ACS is entirely disposed within an interior portion of a housing of the satellite.

According to aspects of the ACS, a total power consumption of the ACS is less than about 3 watts or even less than about 2.5 watts. Each of SGCMGs may be configured to generate a torque of at least about 0.75 Nmm. In one embodiment, the plurality of SGCMGs consists of four SGCMGs arranged in a rectangular pyramidal configuration with respect to one another. Each of the SGCMGs may have a longitudinal axis extending at an angle of about 40 degrees with respect to a central axis extending between the arrangement of SGCMGs.

In one aspect, each of the SGCMGs includes a flywheel assembly and a gimbal assembly. For example, the flywheel assembly may include a flywheel housing, at least one flywheel rotationally disposed within the flywheel housing, and a flywheel motor configured to drive the flywheel via a drive shaft of the flywheel. The drive shaft of the flywheel may have a rotational axis oriented substantially perpendicular to a longitudinal axis extending through the SGCMG. The gimbal assembly may include an L-shaped bracket comprising a first end surface and a second end surface and a gimbal motor having a rotational axis oriented substantially co-axial to the longitudinal axis of the SGCMG. The gimbal motor is coupled to the second end surface and is configured to rotate the flywheel assembly about the longitudinal axis of the SGCMG and between the first end surface and the gimbal motor. Moreover, a central longitudinal axis may extend between the arrangement of SGCMGs and includes a first end and a second end such that an apex of the arrangement is disposed adjacent the first end and a base of the arrangement is disposed adjacent the second end. The first end surface of the bracket of the gimbal assembly may be disposed adjacent the apex of the arrangement, while the second end surface of the bracket of the gimbal assembly may be disposed adjacent the base of the arrangement.

According to an additional aspect, the ACS includes a slip ring assembly coupled to the first end surface of the bracket for providing electrical power and feedback to the flywheel assembly. The flywheel motor and/or the gimbal motor may be a framed DC motor or a frameless DC motor. A gimbal plate may be disposed between the second end surface of the bracket and the gimbal motor and be configured to engage both the second end surface of the bracket and the gimbal motor. The ACS may also include at least one flywheel motor driver board coupled to the flywheel assembly such that the flywheel motor driver board is configured to rotate with the flywheel assembly. For instance, the ACS may include a pair of flywheel motor driver boards coupled to the flywheel assembly and one another such that the flywheel motor driver boards are configured to rotate with the flywheel assembly. The ACS may further include an inertial measurement unit coupled to the second end surface of the bracket of each of the plurality of SGCMGs. In addition, the ACS may include a processor for controlling the plurality of SGCMGs, wherein the processor contains control and feedback algorithms for controlling the attitude of the satellite and steering logics for controlling the SGCMGs.

In one aspect, each SGCMG includes a flywheel assembly and a gimbal assembly, wherein the flywheel assembly includes a flywheel housing having a first shaft and a second shaft, wherein each shaft extends from an exterior of the flywheel housing along a longitudinal axis of the SGCMG, and wherein the first shaft extends from a first side of the flywheel housing and the second shaft extends from a radially opposite second side of the flywheel housing. The flywheel assembly also includes at least one flywheel rotationally disposed within the flywheel housing and a flywheel motor configured to drive the flywheel via a drive shaft of the flywheel, wherein the drive shaft of the flywheel has a rotational axis oriented substantially perpendicular to a longitudinal axis extending through the SGCMG. The gimbal assembly includes an L-shaped bracket comprising a first end surface and a second end surface, wherein the first end surface defines a first opening configured for receiving the first shaft of the flywheel housing. Furthermore, the gimbal assembly includes a gimbal motor coupled to the second end surface and engaged with the second shaft of the flywheel housing, wherein the gimbal motor is configured for rotating the second shaft of the flywheel housing about the longitudinal axis of the SGCMG. The flywheel assembly is rotationally disposed between the first end surface and the gimbal motor when the first shaft is engaged within the first opening and the second shaft is engaged with the gimbal motor.

According to an alternative aspect, a single-gimbaled control moment gyroscope (SGCMG) is provided and includes a flywheel assembly and a gimbal assembly. The flywheel assembly includes a flywheel housing, at least one flywheel rotationally disposed within the flywheel housing, and a flywheel motor configured to drive the flywheel via a drive shaft of the flywheel, wherein the drive shaft of the flywheel has a rotational axis oriented substantially perpendicular to a longitudinal axis extending through the SGCMG. The gimbal assembly includes an L-shaped bracket comprising a first end surface and a second end surface and a gimbal motor having a rotational axis oriented substantially co-axial to the longitudinal axis of the SGCMG, wherein the gimbal motor is coupled to the second end surface and is configured for rotating the flywheel assembly about the longitudinal axis of the SGCMG and between the first end surface and the gimbal motor.

An additional embodiment is directed to a single-gimbaled control moment gyroscope (SGCMG) also including a flywheel assembly and a gimbal assembly. The flywheel assembly includes a flywheel housing, at least one flywheel rotationally disposed within the flywheel housing, a flywheel motor configured to drive the flywheel via a drive shaft of the flywheel, and at least one flywheel motor driver board coupled to the flywheel housing, wherein the drive shaft of the flywheel has a rotational axis oriented substantially perpendicular to a longitudinal axis extending through the SGCMG. The gimbal assembly includes a bracket comprising a first end surface and a second end surface and a gimbal motor having a rotational axis oriented substantially co-axial to the longitudinal axis of the SGCMG, wherein the gimbal motor is coupled to the second end surface and configured for rotating the flywheel assembly about the longitudinal axis of the SGCMG and between the first end surface and the gimbal motor.

A further embodiment of the present invention is directed to a method for providing three-axis attitude control of a pico- or a nano-satellite. The method includes providing an attitude control system (ACS) comprising a plurality of single-gimbaled control moment gyroscopes (SGCMG) arranged in a pyramidal configuration, wherein the ACS occupies a volume of less than about 100 mm×100 mm×50 mm of the satellite and has a mass less than about 500 grams. The method also includes controlling the SGCMGs to produce a net torque on the satellite to adjust the attitude thereof.

BRIEF DESCRIPTION OF THE DRAWINGS

Reference will now be made to the accompanying drawings, which are not necessarily drawn to scale, and wherein:

FIG. 42 is a table listing control torque span of the SGCMG according to embodiments of the present invention;

FIG. 43 is a table listing the breakdown of masses of individual components of an example satellite according to embodiments of the present invention;

FIG. 44 is a table listing the breakdown of masses of individual components of an example ACS according to embodiments of the present invention;

FIG. 45 is a table listing the breakdown of estimated and achieved masses of individual components of an example SGCMG according to embodiments of the present invention;

FIG. 46 is a table listing simulation parameters for an example ACS simulation according to embodiments of the present invention; and FIG. 47 is a table listing orbital parameters according to embodiments of the present invention.

DETAILED DESCRIPTION OF VARIOUS EMBODIMENTS OF THE INVENTION

Various embodiments of the present invention will now be described more fully hereinafter with reference to the accompanying figures, in which some, but not all embodiments of the inventions are shown. Indeed, these inventions may be embodied in many different forms and should not be construed as limited to the embodiments set forth herein. Rather, these embodiments are provided so that this disclosure will satisfy applicable legal requirements. Like numbers refer to like elements throughout.

Introduction

Embodiments of the present invention are directed to control moment gyroscopes (CMG) and, in particular, single-gimbaled control moment gyroscopes (SGCMG) capable of rapid retargeting (e.g., high slew rates) and full three-axis attitude control of small satellites using a compact actuation system. In one embodiment and as discussed in further detail below, four SGCMGs may be arranged in a pyramidal configuration that provide verification and on-orbit validation of a black-boxed attitude actuation system. The SGCMG is configured for use with pico-class satellites (e.g., CubeSat) but is scalable to larger satellites (e.g., nano- and micro-classes).

The SGCMG attitude control system (ACS) is the scientific payload. The design of the SGCMG is motivated by the need for precision attitude control for pico- and nano-satellites. In order to satisfy this need, the SGCMG should meet the mass, power, and volume constraints of these small satellites according to various embodiments. The design of the SGCMG control for a pico-satellite is motivated by the novelty in its application and the potential for its use in low cost responsive missions.

Figure 39:
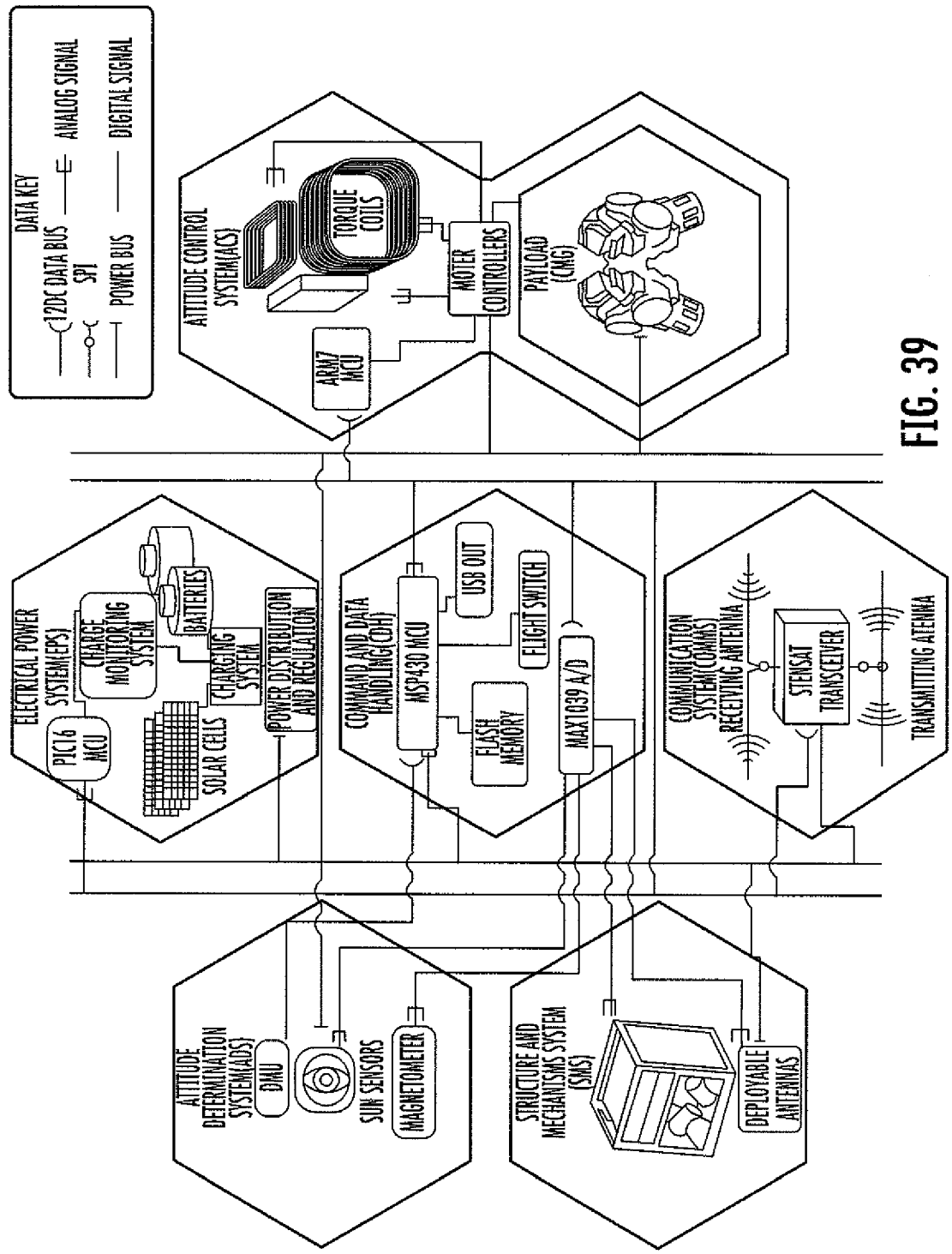
FIG. 39 shows a schematic of various subsystems for a satellite according to one embodiment.
Figure 40:
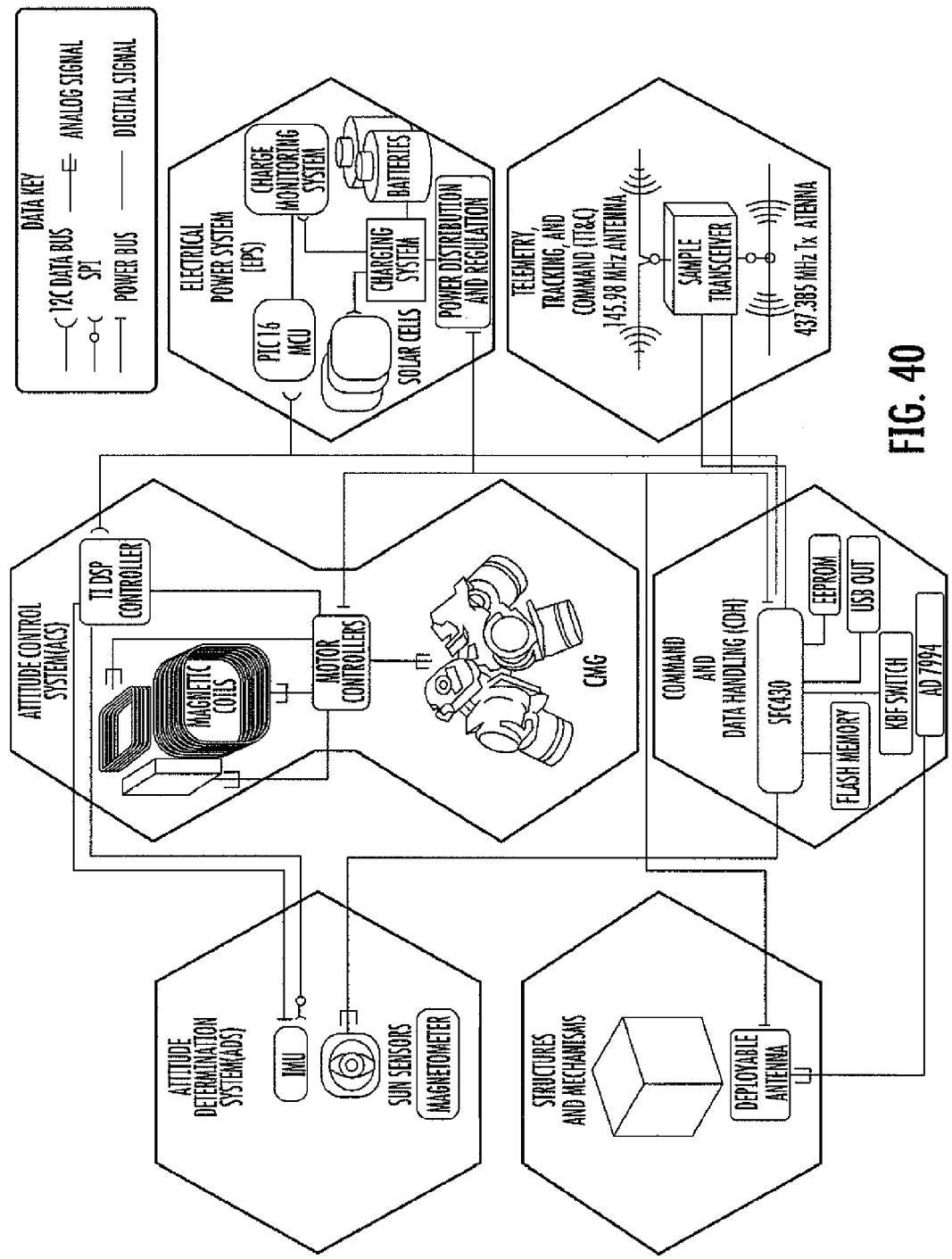
FIG. 40 shows a schematic of various subsystems for a satellite according to another embodiment.
Figure 41:
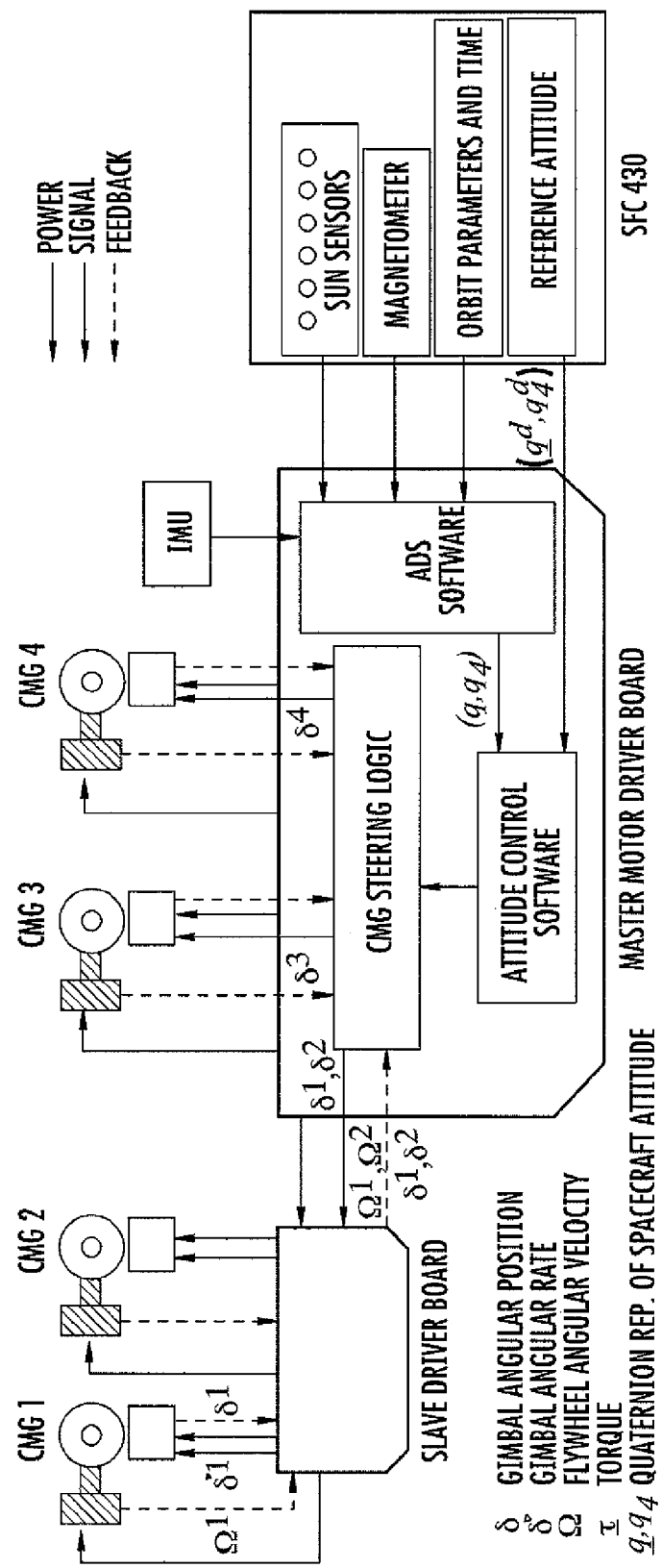
FIG. 41 depicts a schematic of a control system for an ACS according to one embodiment of the present invention.

In one embodiment, the innovation of this payload is the miniaturization of the SGCMG as its actuators and has a redundant set of four of them in a pyramid arrangement for full three-axis active attitude control. To support this payload, the satellite contains a suite of subsystems, including power, communications, health monitoring, attitude determination, and a command and data handling system to coordinate the systems, as shown in FIGS. 39-41 and discussed in further detail below. For pico-satellites, available volume, power, mass, and computation are at a premium. Therefore, careful management of these resources is preferred in various embodiments and, where possible, hardware is shared between subsystems. Grouping together the sensor data acquisition hardware and computation for many of the major subsystems onto a single physical board that includes the whole of the command and data handling (CDH) system and parts of many other subsystems simplifies the system architecture.

Figure 1:
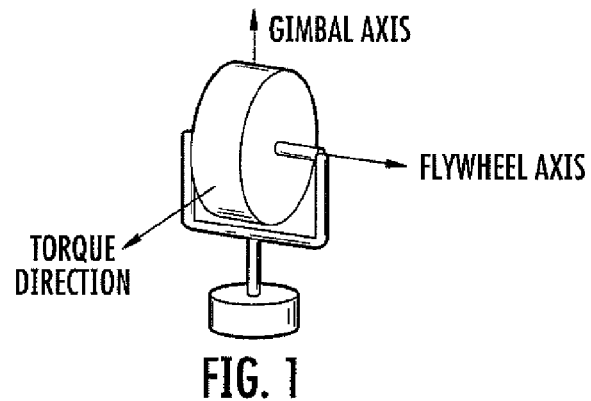
FIG. 1 illustrates a basic diagram of a control moment gyroscope.
Figure 2:
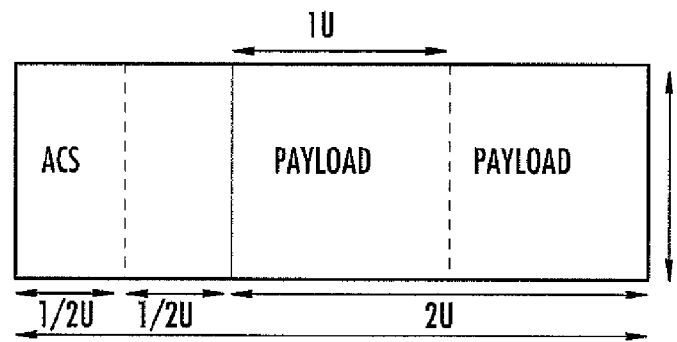
FIG. 2 illustrates a side view of a satellite including an attitude control system according to one embodiment of the present invention.
Figure 3:
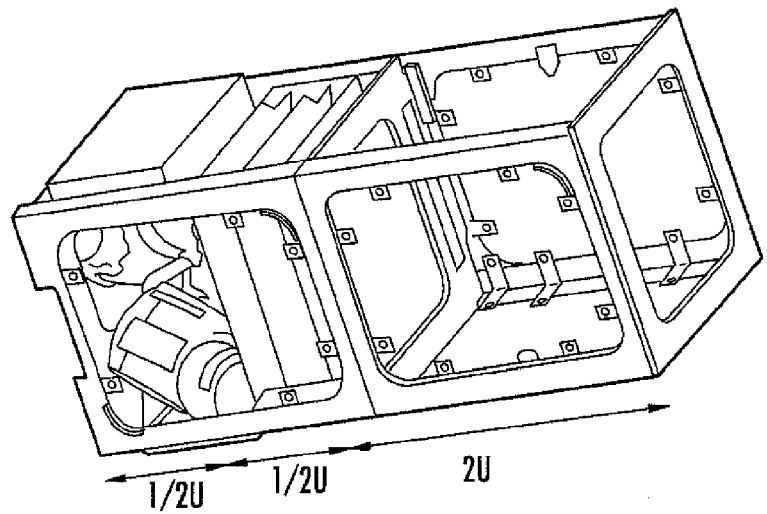
FIG. 3 illustrates a perspective view of a satellite including an attitude control system according to one embodiment of the present invention.

According to one embodiment, the SGCMG ACS was designed with the following considerations:
  Maximum inertia of the flywheel and its rotation axis
  Minimum inertia about the gimbal axis
  Structural integrity during launch
  Minimum mass
  Minimum power consumption The SGCMG is designed based on specifications that will enable its use as an attitude control actuator for rapid retargeting and precision pointing of pico-satellites (typically in low earth orbits). Specifications according to one embodiment for achieving these goals include:

a. The mass of the ACS with electronics shall be less than about 500 g.
  b. The volume occupied by the ACS shall be less than about ½ U (i.e., 100 mm×100 mm×50 mm). FIGS. 2 and 3 illustrate an ACS occupying ½ U of a satellite according to one embodiment.
  c. The total power consumption shall be less than about 3 W.
  d. The ACS shall achieve a pointing accuracy within about 0.1° of ADS measurement.
  e. The ACS shall enable a slew rate of about 2-3 deg/s for the 1 U satellite.
  f. The SGCMGs shall produce a maximum torque of about 0.8 Nmm.
  g. The hardware shall conform to the environmental specification as delineated in the NASA GEVS document.
  h. The design shall make use of commercial off the shelf (COTS) hardware.

SGCMG Dynamics

The general working principle and torque generation property of the CMG was described above. The following discussion relates to the development of the governing differential equation of the SGCMG. The torque span of a single SGCMG lies in a plane; to be able to control attitude about all three axes, multiple SGCMGs in appropriate configurations are required to produce torque in 3D space. Different such configurations of SGCMGs which produce different torque spans are discussed briefly and the pyramidal configuration which produces a near spherical torque span is considered for development of equations and simulations.

Equations of Motion

The SGCMG produces torque by redistribution of angular momentum; it is a device that stores angular momentum in its flywheels and produces a torque by changing the direction of the flywheel axis or the angular momentum vector. The equation of motion that governs this characteristic is developed below.

Nomenclature $\underline{H}_C$—Total angular momentum of the CMG about the satellite center of mass (cm)

$\underline{H}_C^f$—Angular momentum of the flywheel about the satellite cm $\underline{H}_C^g$—Angular momentum of the gimbal about the satellite cm $\underline{I}^f$—Inertia of the flywheel
$\underline{I}^g$—Inertia of the gimbal
$\underline{\omega}^f$—Angular velocity of the flywheel
$\underline{\dot{\omega}}^f$—Angular acceleration of the flywheel
$\underline{\delta}$—Angular velocity of the gimbal
$\underline{\dot{\delta}}$—Angular acceleration of the gimbal $\underline{\tau}^d$—Total dynamic torque produced by the CMG
$\underline{\tau}^{gy}$—Total gyroscopic torque produced by the CMG
$\underline{\tau}^{fa}$—Torque due to flywheel acceleration
$\underline{\tau}^{ga}$—Torque due to gimbal acceleration
$\underline{\tau}^{ff}$—Torque due to flywheel bearing friction
$\underline{\tau}^{gf}$—Torque due to gimbal bearing friction
$\underline{\tau}^{sf}$—Torque due to slip ring friction Derivation The total angular momentum of the SGCMG, $$\underline{H}_G = \underline{H}_G^f + \underline{H}_G^g \tag{1}$$

$$\underline{H}_G = \underline{I}^f \underline{\omega}^f + \underline{I}^g \underline{\dot{\delta}} \tag{2}$$

From Eulers law, the rate of change of angular momentum is equal to the torque acting on the system.

$$\frac{d}{dt}(\underline{H}_G) = \frac{d}{dt}(\underline{I}^f \underline{\omega}^f) + \frac{d}{dt}(\underline{I}^g \underline{\dot{\delta}}) + \underline{\delta} \times (\underline{I}^f \underline{\omega}^f + \underline{I}^g \underline{\dot{\delta}}) \tag{3}$$

$$\frac{d}{dt}(\underline{H}_G) = \frac{d}{dt}(\underline{I}^f \underline{\omega}^f) + \frac{d}{dt}(\underline{I}^g \underline{\dot{\delta}}) + \underline{\delta} \times (\underline{I}^f \underline{\omega}^f)$$

$$\frac{d}{dt}(\underline{H}_G) = \underbrace{\underline{I}^f \underline{\dot{\omega}}^f}_{\text{Flywheel Acceleration}} + \underbrace{\underline{I}^g \underline{\ddot{\delta}}}_{\text{Gimbal Acceleration}} + \underbrace{\underline{\delta} \times (\underline{I}^f \underline{\omega}^f)}_{\text{Gyroscopic (control)}} = \underline{\tau}^d \tag{4}$$

Equation (4) is the governing equation for the dynamic torque produced by the SGCMG. Torque due to flywheel and gimbal accelerations are not used for control and are unwanted consequences which occur during start and stop of flywheel and gimbal motion; it is ideal to have the torques due to flywheel and gimbal accelerations to be zero. These torques are very small compared to the gyroscopic torque in a SGCMG for large satellites and do not have a considerable effect on the satellite attitude. This is because the torques are very small to affect the attitude of satellite with large inertia. But in a SGCMG for a small satellite, the torques due to flywheel and gimbal accelerations are considerable and cannot be neglected. Apart from the torques mentioned above, there are frictional torques from the flywheel and gimbal bearings and slip ring which, in a small satellite, are of a considerable magnitude to cause disturbance to the attitude of the satellite. The frictional torques along with the torques due to the flywheel and gimbal accelerations are considered as uncontrolled disturbance torques affecting the attitude of the satellite and are considerable in a SGCMG for a pico-satellite. This poses a challenge to the control system and is complicated.

The total torque acting on the satellite due to the CMG is the sum of the gyroscopic and disturbance torques.

$$\tau = \underbrace{\underline{\tau}^{gy}}_{\text{Control torque}} + \underbrace{\underline{\tau}^{fa} + \underline{\tau}^{ga} + \underline{\tau}^{gf} + \underline{\tau}^{sf}}_{\text{Disturbance torques}} \tag{5}$$

CMG Configurations

A combination of multiple SGCMGs in different configurations can be used to shape the torque span in 3D space. Various such configurations have been developed and used in many applications; some of the configurations include the roof top configuration, box configuration, pyramid configuration, and the inline configuration.

In one embodiment, a pyramid configuration with four SGCMGs is used and is discussed in the following section in detail.

Pyramid Configuration

Figure 5:
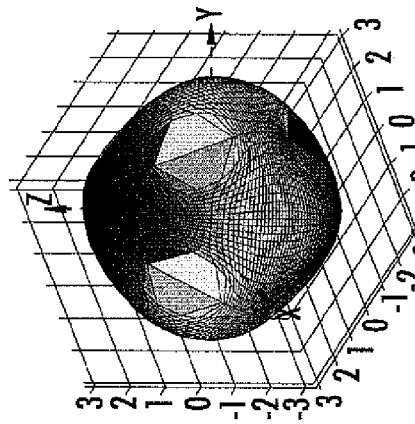
FIG. 5 shows the angular momentum envelope due to the pyramidal configuration according to one embodiment.
Figure 4:
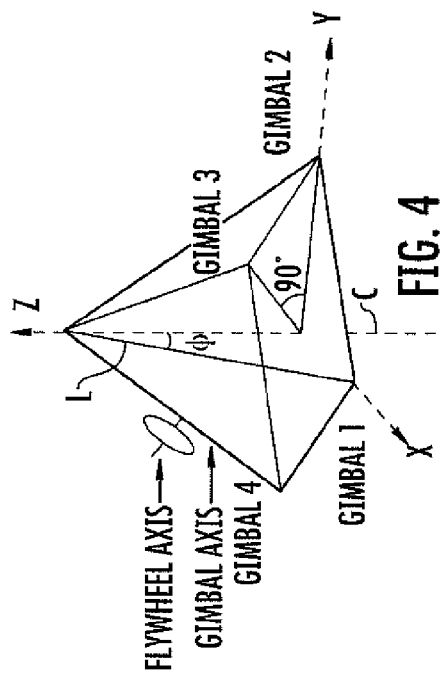
FIG. 4 shows the geometry of a SGCMG having a pyramidal configuration according to one embodiment.

The geometry of the pyramid configuration is based on achieving a near spherical torque envelope [8]. The spherical torque envelope gives uniform control authority in 3D space. The schematic of a pyramidal configuration geometry is shown in FIG. 4, and a SGCMG pyramid is shown in FIGS. 10-11, 37, and 38 according to embodiments of the present invention. The angular momentum envelope due to the pyramidal CMG configuration [9] is shown in FIG. 5, which illustrates the maximum available momentum in any direction with a combination of all four SGCMGs. Any attitude maneuver using the SGCMGs which requires more than the limit of the envelope will saturate the SGCMGs.

The main parameters that define the geometry of the ACS are the inclination angle $\phi$ and the actuator spacing angle. The actuator spacing angle was selected as 90° to achieve equal momentum spans in all directions. The inclination angle may be selected for achieving a desired angular momentum. For example, in one embodiment the inclination angle is about 40°. However, the inclination angle could be about 54.74° so as to obtain a semi-spherical angular momentum envelope. However, in various embodiments, the angle may be between about 35° to about 55°.

Coordinatized Equations of Motion and Torque Analysis

Figure 6:
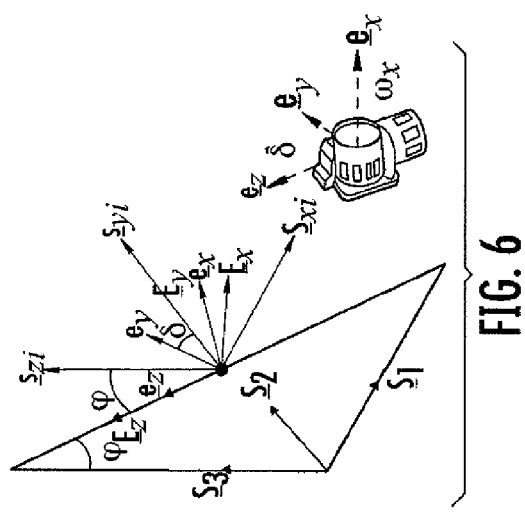
FIG. 6 depicts the various coordinate frames representing the equations of motion of the SGCMG according to one embodiment.

The vectorial equations of motion developed above need to be appropriately represented in co-ordinate frames in order to estimate the value of the torque produced by the SGCMG. The equations are represented in the co-ordinate frame fixed to gimbals and then transformed into the satellite body frame. The various coordinate frames involved in the transformation are seen in FIG. 6. The angular momentum of the SGCMG, $\underline{H}_G$ represented in the coordinate frame $(\underline{e}_x, \underline{e}_y, \underline{e}_z)$ attached to the flywheel axis is given by $$\underline{H}_G = \underline{I}^f \cdot \underline{\omega}^f + \underline{I}^g \cdot \underline{\dot{\delta}} / [I_{xx}{}^f \omega_x 0 I_{zz}{}^g \dot{\delta}]^T$$

Equation (4) represented in the coordinate frame $(\underline{E}_x, \underline{E}_y, \underline{E}_z)$ fixed to the gimbal axis is $$^G\underline{\tau}^d = -(I_{xx}{}^f \omega_x \dot{\delta} \sin(\delta))\underline{E}_x + (I_{xx}{}^f \omega_x \dot{\delta} \cos(\delta))\underline{E}_y + (I_{zz}{}^g \ddot{\delta})\underline{E}_z \quad (6)$$

Transforming Equation (6) into the co-ordinate frame fixed to the satellite, the dynamic torque is given Equation (7) $\underline{C}_1$ is the transformation of the gimbal inclination and $\underline{C}_2{}^1$ is the transformation from the $i^{th}$ SGCMG gimbal frame to the satellite frame $$^C\underline{\tau}^{di} = \underline{C}_2^i \cdot \underline{C}_1 \cdot {}^G\underline{\tau}^{di} \quad (7)$$

$$\underline{C}_1 = \begin{bmatrix} \cos\varphi & 0 & -\sin\varphi \\ 0 & 1 & 0 \\ \sin\varphi & 0 & \cos\varphi \end{bmatrix}$$

$$\underline{C}_2^1 = \begin{bmatrix} 1 & 0 & 0 \\ 0 & 1 & 0 \\ 0 & 0 & 1 \end{bmatrix}, \underline{C}_2^2 = \begin{bmatrix} 1 & 0 & 0 \\ 0 & 1 & 0 \\ 0 & 0 & 1 \end{bmatrix},$$

$$\underline{C}_2^3 = \begin{bmatrix} 1 & 0 & 0 \\ 0 & 1 & 0 \\ 0 & 0 & 1 \end{bmatrix}, \underline{C}_2^4 = \begin{bmatrix} 1 & 0 & 0 \\ 0 & 1 & 0 \\ 0 & 0 & 1 \end{bmatrix},$$

The total dynamic torque produced by all four SGCMGs represented in the coordinate frame fixed to the satellite is given by $$^C\underline{\tau}^d = \sum_{i=1}^{4} {}^C\underline{\tau}^{di} \quad (8)$$

Figure 7:
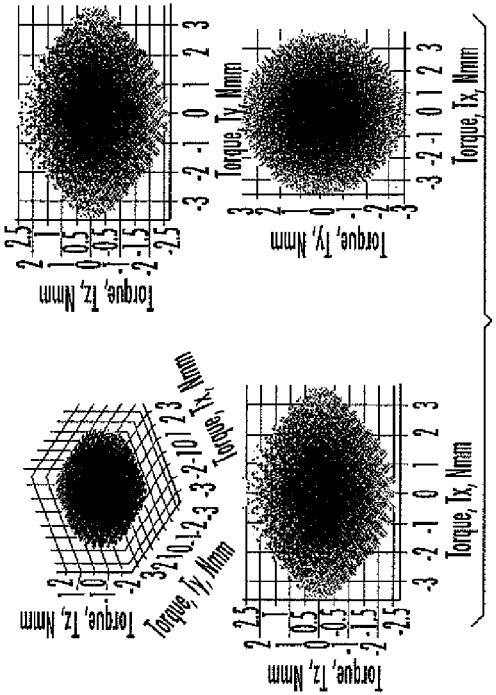
FIG. 7 illustrates the control torque span of the SGCMG according to one embodiment.

The control torque span of the SGCMG (from equation (8)) for parameters listed in FIG. 42 is shown in FIG. 7. It shows the maximum torque available in any direction and is a plot of the torque for discrete positions of the SGCMG gimbals.

CMG Theory and Steering Logic

The SGCMG theory can be developed by further developing the dynamics of the spacecraft with the ACS attached to the spacecraft. The torque generated by the ACS is an internal torque and is generated by redistributing the angular momentum of the SGCMGs. For the control and steering logic development, we will assume that the spacecraft's inertia dyadic stays constant.

Equations of Motion of Spacecraft

We begin by first picking unit quaternions as the set of parameters to represent the orientation of the body frame relative to an inertial reference frame. A quaternion is composed of a vector element and a scalar element where $\underline{e}$ is the eigenaxis and $\theta$ is the corresponding eigen angle that relates the two reference frames.

$$q = \begin{bmatrix} \varepsilon \\ \eta \end{bmatrix} = \begin{bmatrix} \sin\left(\frac{\theta}{2}\right)\underline{e} \\ \cos\left(\frac{\theta}{2}\right) \end{bmatrix} \quad (9)$$

We can also directly relate the quaternion rates to the angular rates.

$$\dot{q} = \frac{1}{2} \begin{bmatrix} -\omega^x & \omega \\ -\omega^T & 0 \end{bmatrix} q = \frac{1}{2} \begin{bmatrix} \eta \underline{I} + \varepsilon^x \\ -\varepsilon^T \end{bmatrix} \underline{\omega} \quad (10)$$

Quaternions are also useful, since orientation errors can be represented uniquely by another quaterion denoted as the error quaternion.

$$q_e = q_1 \otimes q_2 = \begin{bmatrix} \eta_1 \underline{I} - \varepsilon_1^x & \varepsilon_1 \\ -\varepsilon_1^T & \eta_1 \end{bmatrix} \begin{bmatrix} \varepsilon_2 \\ \eta_2 \end{bmatrix} = \begin{bmatrix} \eta_2 \underline{I} - \varepsilon_2^x & \varepsilon_2 \\ -\varepsilon_2^T & \eta_2 \end{bmatrix} \begin{bmatrix} \varepsilon_1 \\ \eta_1 \end{bmatrix} = \begin{bmatrix} \varepsilon_e \\ \eta_e \end{bmatrix} \quad (11)$$

Next we consider the total angular momentum of the spacecraft and the ACS, $$\underline{H} = \underline{H}_S + \underline{H}_G \quad (12)$$

$$\underline{H} = \underline{I}^S \underline{\omega}^S + \underline{H}_G \quad (13)$$

If we take the time rate of change of this angular momentum about the center of mass of the system and assume no external torques are acting on the system we can obtain the governing equations for the attitude dynamics of the spacecraft.

$$\frac{d}{dt}(\underline{H}) = \underline{\dot{I}}^S \cdot \underline{\omega}^S + \underline{I}^S \cdot \underline{\dot{\omega}}^S + \underline{\tau}^d + \underline{\omega}^S \times (\underline{I}^S \cdot \underline{\omega}^S + \underline{H}_G) = \underline{0} \quad (14)$$

We will also assume that the inertia changes on the spacecraft are negligible. Thus, the attitude controller to asymptotically regulate the error quaternion to zero is defined below [8][13].

$$\underline{\tau}^d = \underline{\omega}^S \times (\underline{H}) - k\underline{I}^S \cdot \underline{\omega}^S - 2c\underline{I}^S \cdot \underline{\varepsilon}_e \quad (15)$$

Steering Logic

Now that the trajectory for the attitude states is defined, we must define the trajectory for the gimbal angles, which is the actual control input for the actuator. This is done considering the definition of the torque produced by the gimbals discussed above. If we add the internal torque produced by the SGC-MGs and represent them in the body frame, we obtain, $$\underline{\tau}^d = \begin{bmatrix} -c(\phi)I_{xx}^f\omega_x^f s(\delta_1) & -I_{xx}^f\omega_x^f c(\delta_2) & c(\phi)I_{xx}^f\omega_x^f c(\delta_3) & I_{xx}^f\omega_x^f c(\delta_4) \\ I_{xx}^f\omega_x^f c(\delta_1) & -c(\phi)I_{xx}^f\omega_x^f s(\delta_2) & -I_{xx}^f\omega_x^f c(\delta_3) & c(\phi)I_{xx}^f\omega_x^f s(\delta_4) \\ s(\phi)I_{xx}^f\omega_x^f s(\delta_1) & s(\phi)I_{xx}^f\omega_x^f s(\delta_2) & s(\phi)I_{xx}^f\omega_x^f s(\delta_3) & s(\phi)I_{xx}^f\omega_x^f s(\delta_4) \end{bmatrix} \begin{bmatrix} \dot{\delta}_1 \\ \dot{\delta}_2 \\ \dot{\delta}_3 \\ \dot{\delta}_4 \end{bmatrix} + \begin{bmatrix} s(\phi)I_{zz}^g & 0 & -s(\phi)I_{zz}^g & 0 \\ 0 & s(\phi)I_{zz}^g & 0 & -s(\phi)I_{zz}^g \\ c(\phi)I_{zz}^g & c(\phi)I_{zz}^g & c(\phi)I_{zz}^g & c(\phi)I_{zz}^g \end{bmatrix} \begin{bmatrix} \ddot{\delta}_1 \\ \ddot{\delta}_2 \\ \ddot{\delta}_3 \\ \ddot{\delta}_4 \end{bmatrix} \quad (16)$$

Thus, we relate the torque output from the CMGs to the control law and as a result have a matrix equation where we solve for the gimbal rates. This is the steering logic problem.

$$\underline{\tau}^d = \underline{A}(\underline{\delta})\dot{\underline{\delta}} + \underline{B}\ddot{\underline{\delta}} = \underline{\omega}^S \times (H) - k\underline{I}^S \cdot \underline{\omega}^S - 2c\underline{I}^S \cdot \underline{\epsilon}_e \quad (17)$$

$$(\underline{A}(\underline{\delta} - \tilde{\omega}^S\underline{B})\dot{\underline{\delta}} = -\underline{\omega}^S \times (\underline{I}^S\underline{\omega}^S + \underline{h}) - k\underline{I}^S\underline{\omega}^S - 2c\underline{I}^S\underline{\epsilon}_e \underline{B}\ddot{\underline{\delta}} = \underline{u} \quad (18)$$

The default steering logic may be the Generalized Singularity Robust Inverse [9]. This steering logic is based on the least squares solution to this equation [14], $$\underline{\delta} = \hat{\underline{A}}^T (\hat{\underline{A}}\hat{\underline{A}}^T + \lambda \underline{E})^{-1} \underline{u} \quad (19)$$

$$\hat{\underline{A}} = \frac{(\underline{A}(\underline{\delta}) - \tilde{\omega}^S\underline{B})}{h_0}$$

$$\lambda = \lambda_0 \exp(-\mu \det(\underline{A}\underline{A}^T)) \quad (20)$$

$$\underline{E} = \begin{bmatrix} 1 & \xi_3 & \xi_2 \\ \xi_3 & 1 & \xi_1 \\ \xi_2 & \xi_1 & 1 \end{bmatrix}, \xi_i = \xi_0 \sin(\omega t + \phi_i) \quad (21)$$
$$\xi_0 \ll 1$$

This steering logic was chosen since it is robust to both singularities (when det $(\hat{\underline{A}}\hat{\underline{A}}^T)=0$) and gimbal lock (when $(\hat{\underline{A}} \hat{\underline{A}}^T \lambda \underline{E})^{-1}\underline{u} \in \text{null}(\hat{\underline{A}}^T))$. It should be noted that if singularities and gimbal-lock is encountered, the steering logic will provide torque error to escape this configuration as defined as, $$\underline{\tau}_e = [\underline{I} - h_0 \underline{\hat{A}}^T (\hat{\underline{A}}\hat{\underline{A}}^T + \lambda \underline{E})^{-1}]\underline{u} \quad (22)$$

Whenever away from singularity, 0.1, →0 and the solution becomes the least squares solution.

Satellite Design

Figure 8:
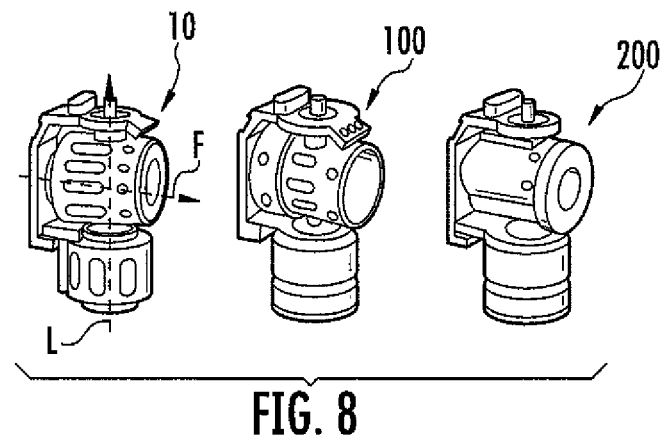
FIG. 8 illustrates various embodiments of SGCMGs according to embodiments of the present invention.
Figure 9:
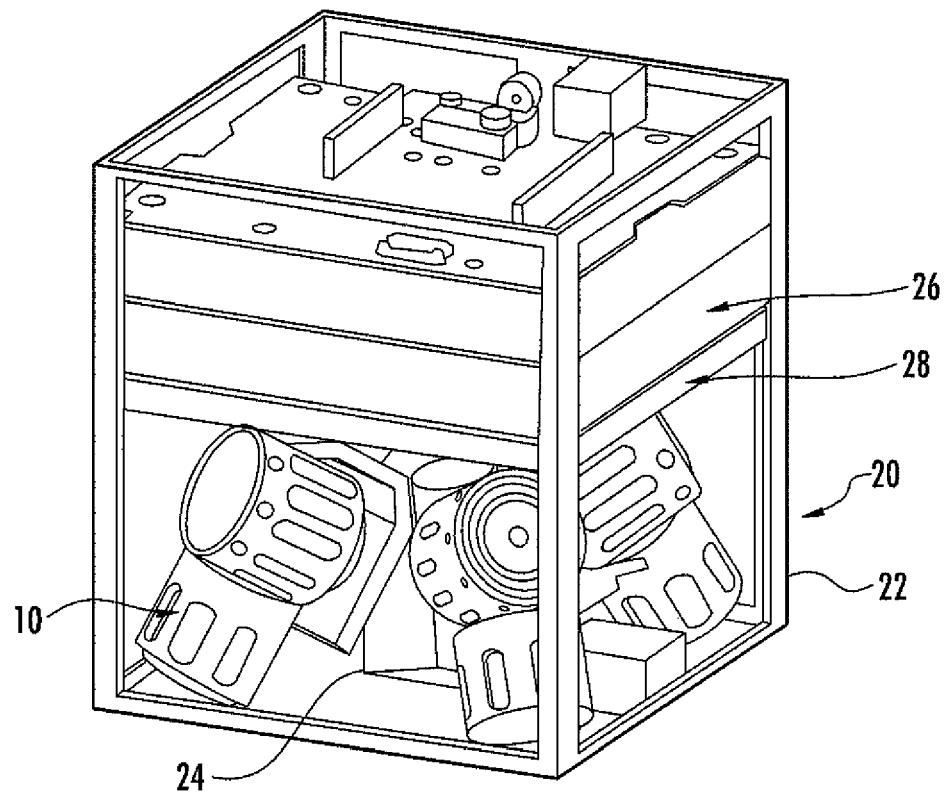
FIG. 9 depicts a perspective view of a satellite according to one embodiment.
Figure 10:
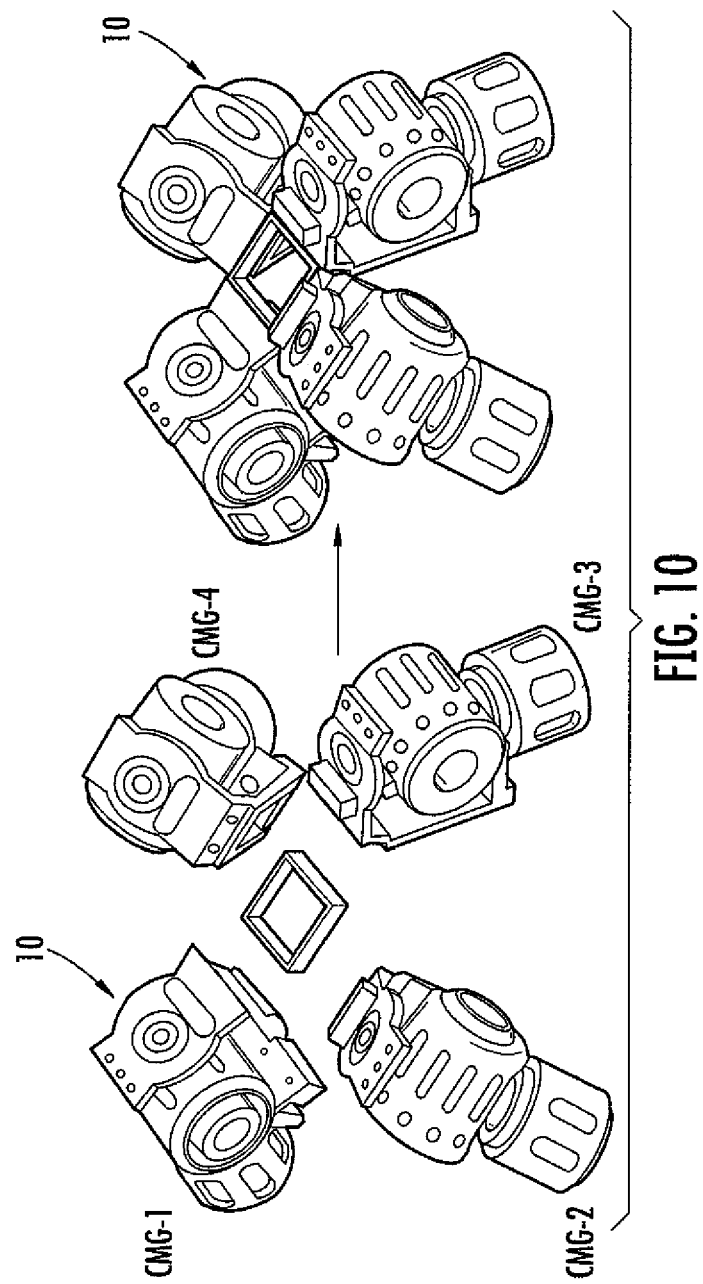
FIGS. 10 and 11 show a plurality of SGCMGs arranged in a pyramidal configuration according to one embodiment.
Figure 11:
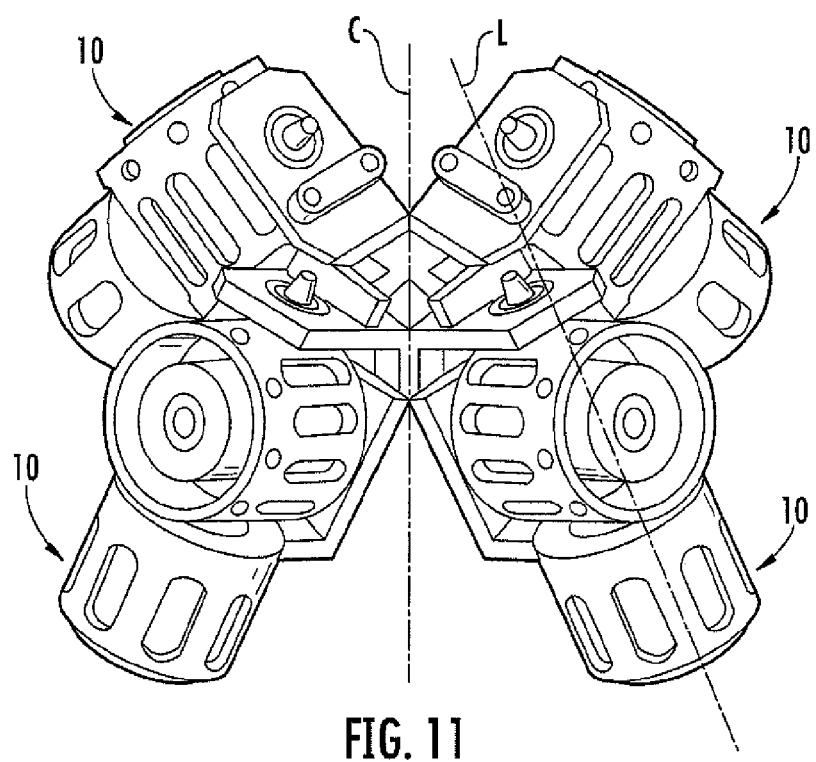
Figure 36:
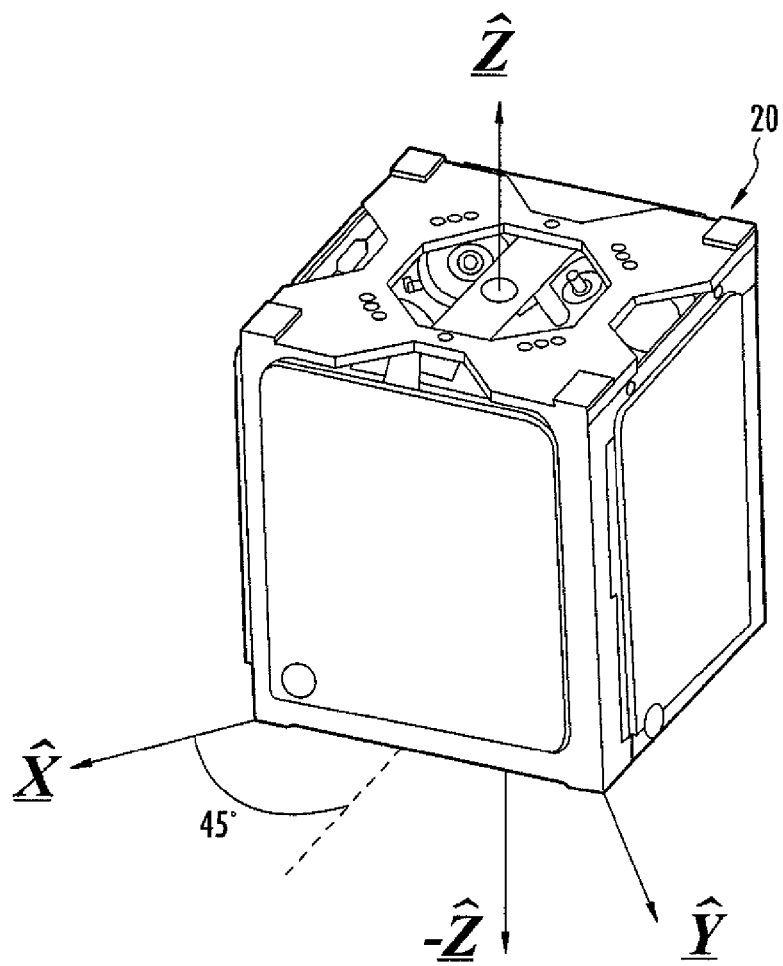
FIG. 36 is a perspective view of an ACS according to another embodiment of the present invention.

FIG. 8 illustrates an exemplary embodiment of SGCMGs 10, 100, 200 that may be used in conjunction with a satellite 20, such as a CubeSat, according to one embodiment (see FIGS. 9 and 36). FIGS. 10-11 illustrate an arrangement of SGCMGs 10 assembled in a pyramidal configuration according to one embodiment and as discussed above. The satellite includes various structural components, such as the frame 22, SGCMGs 10, and hardware brackets. The chassis for the satellite may be a frame designed to comply with the PPOD specifications [10] published by California Polytechnic State University (CalPoly) and house the components pictured in FIG. 9. Moreover, the satellite may include an Inertial Measurement Unit (IMU) 24 and motor driver board 28.

Each structural component is designed to withstand operational and launch loads while maintaining a low mass profile. The selection of material for the structural and other mechanical components are driven by environmental conditions and the loading they are subjected to. For example, the structural components may be made of aluminum and can be anodized. The satellite is designed to be lightweight and according to one embodiment, has a net mass under 1.0 kg, wherein the breakdown of the masses of the individual components is given in FIG. 43.

SGCMG

First Embodiment

Flywheel Assembly

Figure 12:
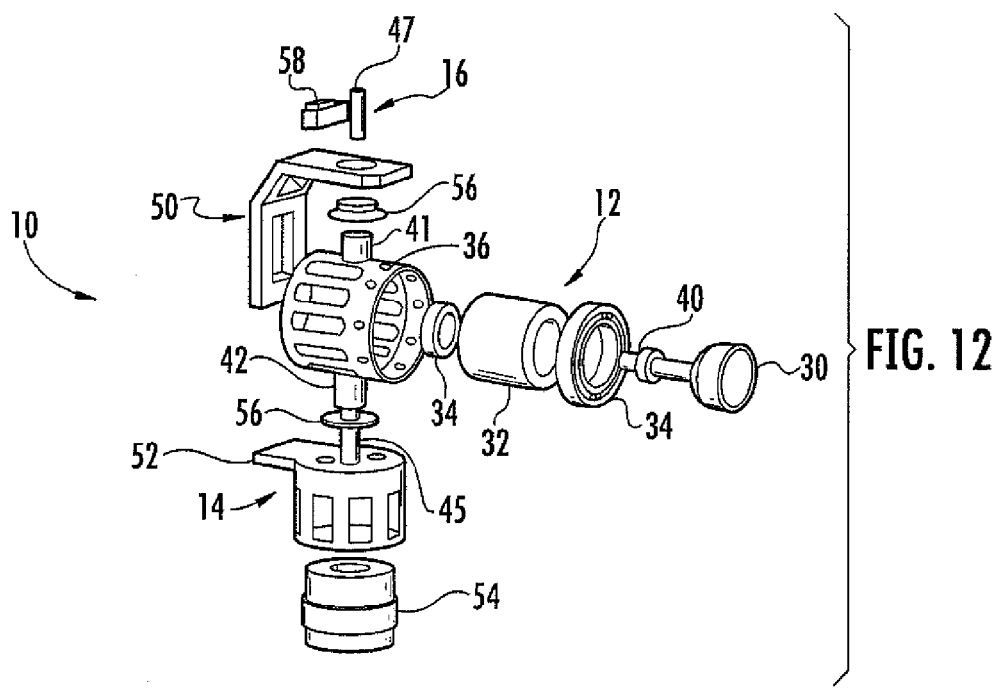
FIGS. 12 and 13 illustrate an exploded view of a SGCMG according to one embodiment.
Figure 13:
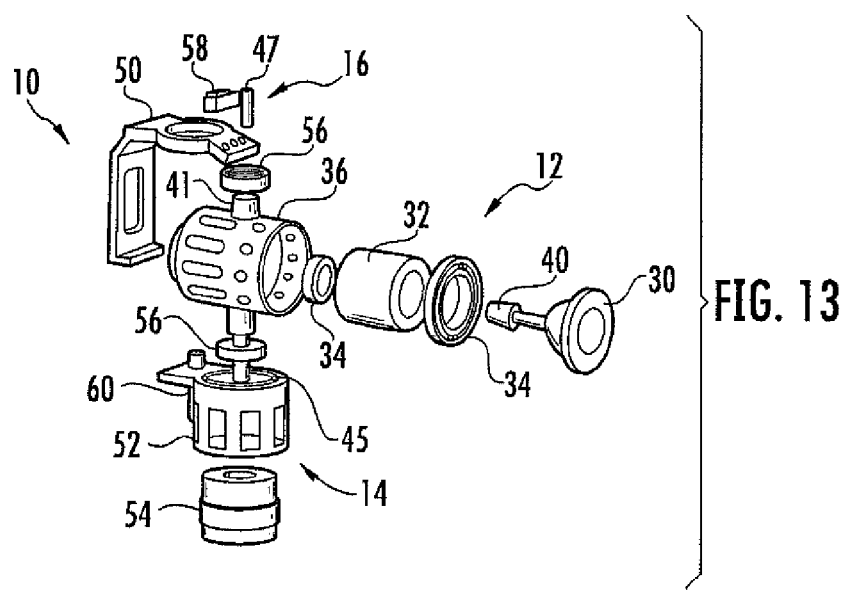
Figure 14:
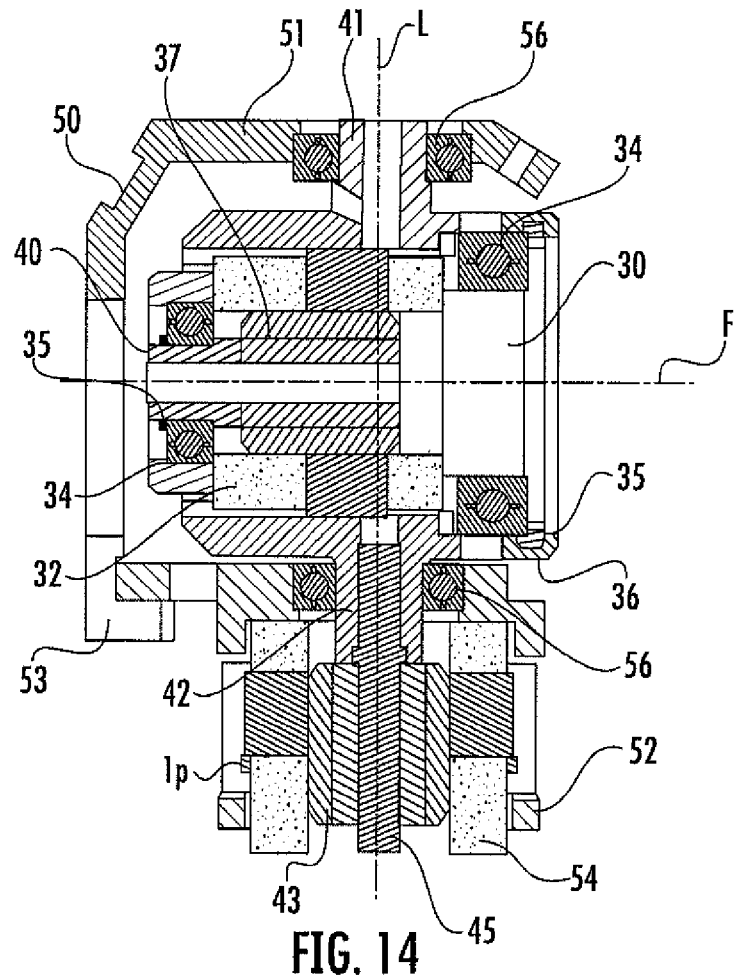
FIG. 14 depicts a cross-sectional view of the SGCMG shown in FIG. 13.

The SGCMG 10 generally includes a flywheel assembly 12, a gimbal assembly 14, and a slip ring assembly 16, as shown in FIGS. 12-14. One particular purpose of the flywheel assembly 12 is to accommodate components required to spin a rotor at high speeds (e.g., 5000 rpm). The flywheel assembly 12 generally includes:

Flywheel housing (36)
Motor (rotor+stator) (32)
Bearings (34)
Snap rings (35)
Flywheel (shaft+endpiece) (30)

Figure 15:
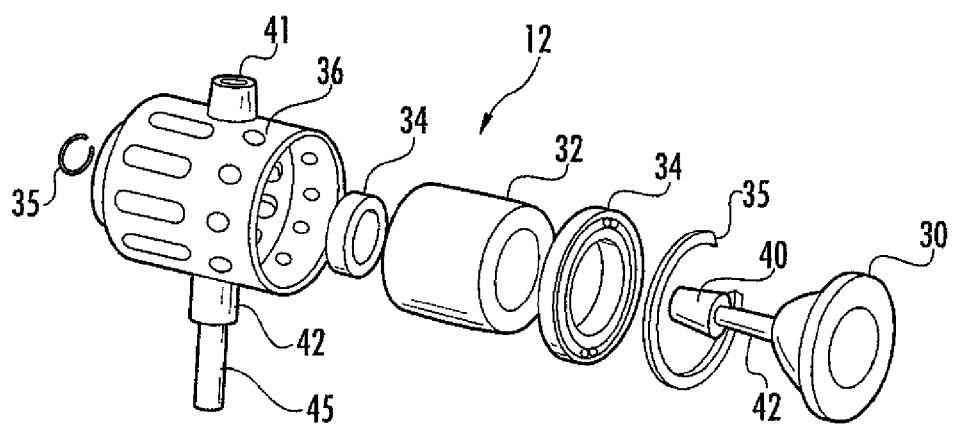
FIG. 15 shows an exploded view of a flywheel assembly of the SGCMG shown in FIGS. 12 and 13.

One function of the flywheel assembly 12 is to accommodate a spinning flywheel 30 and its motor 32 that provide the required angular momentum to the SGCMG. The flywheel assembly 12 also provides an interface to the gimbal assembly 14. An exploded view of the flywheel assembly is shown in FIG. 15, which illustrates the flywheel 30 with the motor rotor (magnet) 37 is mountable on a pair of bearings 34 and capable of being disposed within a flywheel housing 36. The flywheel 30 is driven by a brushless DC motor whose stator (windings) is also located in the same housing. Snap rings 35 are used to axially lock the assembly. The flywheel 30 is spun by the flywheel motor 32 at a constant speed through its lifetime. It is suitable to use a brushless DC (BLDC) motor for this application rather than a brushed DC motor as the brushes may wear out due to increased friction under vacuum conditions. It would also cause additional friction affecting the dynamics of the satellite. Commercial BLDC motors are available in two different forms—framed motors and frameless motors.

Framed motors are in a completely packaged form with their own housing and bearings, while frameless motors are supplied with the rotor and the stator as two separate entities. The stator is a coil winding and the rotor is a radial array of permanent magnets. The rotor 35 attaches directly to the flywheel 30 (see FIG. 23) and gives the designer the freedom to select appropriate bearings, design an integrated flywheel (with the rotor) and save on the additional mass of the motor housing. Thus, it may be desirable to employ a frameless BLDC motor for spinning the flywheel. For example, a RBE 00410 motor from Kollmorgen may be used.

The BLDC motor can be driven by a microcontroller in two different ways—one by using the Hall effect sensor feedback to determine the position of the rotor and the second by using back EMF (electromotive force) generated by the coils as feedback to control the speed of the motor. The second method requires three electrical connections to run the motor as against eight required by the first. The number of electrical connections to the flywheel motor must be limited as all these connections must be routed through the slip ring to allow endless rotation of the flywheel assembly. The use of the back EMF feedback control method allows the use of just three electrical connections to run the motor. This is advantageous as it substantially reduces the size and mass of the slip ring. The back EMF feedback method is hence chosen to drive the flywheel motor.

Figure 23:
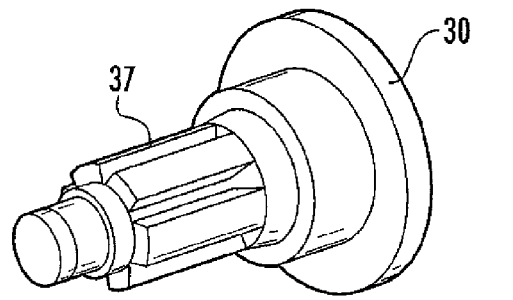
FIG. 23 is an enlarged view of a flywheel and motor rotor coupled thereto according to one embodiment.

The flywheel 30 may be an axisymmetric rotor which is designed to have maximum inertia about its axis of rotation within its mass and volume constraints; it is the momentum storage device of the SGCMG 10. As discussed above, the flywheel inertia directly affects the angular momentum capacity of the flywheel, which in turn determines the torque that the SGCMG can produce. The flywheel 30 is designed to maximize the capacity of angular momentum storage while considering effects of size, mass, and vibrations. The flywheel 30 may be made of metal such as stainless steel to increase the inertia of the flywheel with justifiable tradeoff in the increase of mass. The permanent magnet rotor of the motor 32 is press fit onto the shaft of the flywheel 30 and locked in place by the flywheel end piece 40 which is also press fit on to the shaft. These three components together form the integrated flywheel and rotor assembly, which is balanced on a precision balancing machine (used to balance computer hard disk drives) to minimize vibrations. The vibrations caused due to the imbalance of the flywheel will affect the attitude of the satellite known as attitude jitter [11]. The flywheel and the end piece have machined surfaces for mounting bearings. The flywheel and rotor 37 is shown in FIG. 23. The flywheel assembly 14 may be designed to spin at high speeds, such as between 6000 and 8000 rpm.

The bearings 34 in the flywheel assembly 12 support the integrated flywheel 30 and motor rotor. The bearings 34 should be able to rotate at a continuous speed, such as about 8000 rpm, through the lifetime of the SGCMG 10. For example, hybrid bearings with silicon nitride balls (ceramic) and steel races may be chosen for this application. A hybrid ceramic bearing is a combination of ceramic rolling elements with steel bearing races. The ceramic balls provide a chemically inert surface at the ball-race contact. The SGCMG 10 is not isolated from the rest of the satellite components; the bearings 34 in the SGCMG are expected to run with marginal or no lubrication to prevent outgassing and contamination (due to debris from lubricant) of electronic equipment in the satellite. The hybrid bearings are chosen as they can operate without lubrication for a longer time and have lower coefficient of thermal expansion and lower coefficient of friction compared to steel bearings.

There are two bearings 34 in the flywheel assembly 12, one on each side of the flywheel 30. This placement ensures equal distribution of launch loads on the two bearings. The radial and axial clearances are designed considering the thermal expansion effects and are kept to a minimum to avoid axial and radial movements of the flywheel that can affect the satellite dynamics. For instance, the bearings 34 may be SKF hybrid bearings 618/6-H and 61802-H of ABEC 5P precision degree.

The flywheel housing 36 is designed to house all the components of the flywheel assembly 12 and to serve as an interface between the flywheel assembly and the gimbal assembly 14. In one embodiment, the flywheel housing 36 is cylindrical in shape and includes an opening configured to receive the flywheel 30 and motor 32, although the flywheel housing could be other desired shapes. One or both ends of the flywheel housing 36 may include a flange for receiving and supporting the flywheel 30 therein. Certain sections of the housing 36 may have pockets and lightening holes to reduce the mass of the structure. The housing 36 may be metal, such as aluminum, that has machined surfaces for mounting bearings and motor windings. Grooves may be formed for snap rings 35. In one embodiment, the flywheel assembly 14 includes a first shaft 41 and a second shaft 42 extending along the longitudinal axis "L" of the SGCMG and radially opposite of one another. The first 41 and second 42 shafts may be integrally formed with the housing 36. Alternatively, the second shaft 42 may include an extension shaft 45 coupled thereto (such as by using a threaded locking agent) and extending further outwardly from the housing. The extension shaft 45 is preferably steel to avoid differential expansion between the shaft and the motor rotor 43 of the gimbal motor 54 which may also be made of steel. The rotor 43 of the gimbal motor 54, similar to the flywheel motor 32, is press fit on this extension shaft 45. Moreover, the first shaft 41 is configured to receive the slip ring rotor 47 and routing ports for electrical connections through the slip ring 16. The entire assembly of the housing 36 and the shafts 41, 42 may be machined in a single setup to achieve concentricity around the gimbal axis.

Gimbal Assembly

Figure 16:
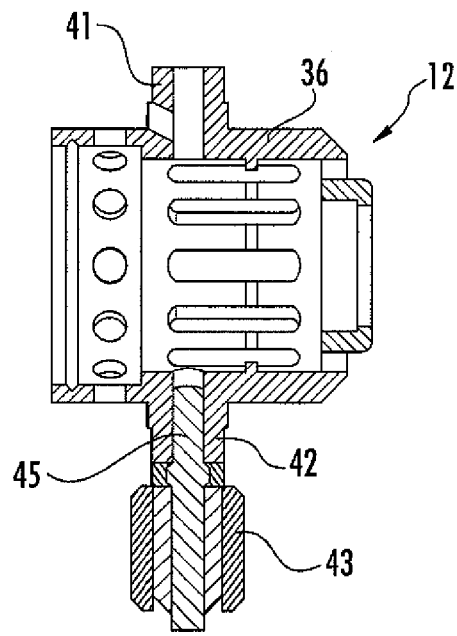
FIG. 16 shows a cross-sectional view of a flywheel assembly of the SGCMG shown in FIGS. 12 and 13.

A gimbal assembly 14 according to one embodiment is shown in FIG. 16. One particular function of the gimbal assembly 14 is to allow rotation of the flywheel assembly 12. The gimbal assembly 14 generally includes:

Gimbal motor (54)
L-bracket (50)
Gimbal housing (52)
Slip ring assembly (16)
Gimbal bushings or bearings (56)

Figure 17:
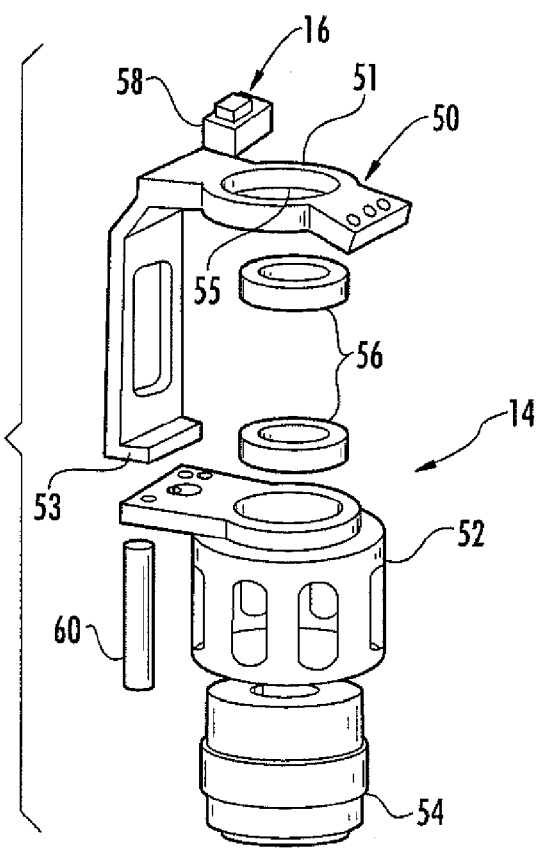
FIG. 17 is an exploded view of a gimbal assembly of the SGCMG shown in FIG. 13.
Figure 18:
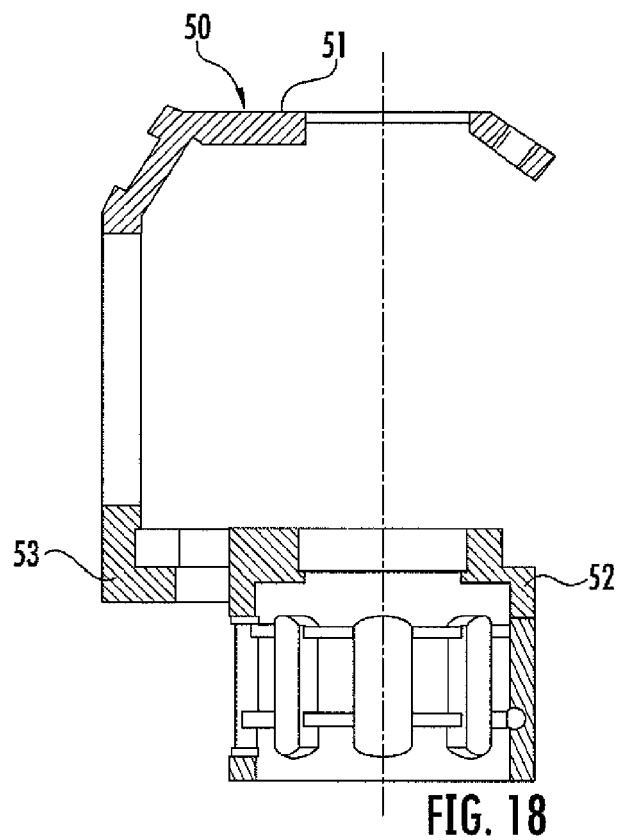
FIG. 18 illustrates a cross-sectional view of the gimbal assembly of the SGCMG shown in FIG. 13.

An exploded view of the gimbal assembly 14 is shown in FIG. 17. The gimbal assembly 12 is configured to facilitate the rotation of the entire flywheel assembly 12 about the gimbal axis (which is co-axial with the longitudinal axis "L" of the SGCMG) which is substantially perpendicular to the flywheel axis ("F") (see FIG. 14). The gimbal assembly 14 includes an L-bracket 50 and a gimbal motor housing 52, as shown in FIG. 18. Apart from providing a pivot for gimbaled movement of the flywheel housing 36, the structural components of the gimbal assembly 14 also have interfaces for mounting of the slip ring brushes, gimbal bearings, gimbal motor, and the inductive sensor.

The gimbal motor 54 is similar to the flywheel motor 32 except for its control method and its operational speed. The speed and position of the gimbal (flywheel housing 36 and gimbal motor rotor 43) which determines the torque output of the SGCMG 10 is determined by the speed and position of the gimbal motor rotor 43. The gimbal motor 54 speed varies, such as between 0 and 2 rad/s, and the angular position of the gimbal should be known at all times. This demands precision feedback control and is achieved by using the Hall effect sensors which are integrated with the motor stator. The gimbal motor 54 hence is controlled using a technique utilizing the feedback from the Hall sensors. The motor 54 may have electrical connections (e.g., 8 such connections) including the feedback lines from the Hall sensors. These connections may be directly connected to the motor control board of the SGCMG 10.

The L-bracket 50 and the gimbal motor housing 52 are the two structural components of the gimbal assembly 14 that together support the pivoting of the flywheel assembly 12. The L-bracket 50 is generally L-shaped, although other shapes (e.g., U-shaped, C-shaped, or J-shaped) could be used that facilitate engagement with the motor 54 while allowing rotation of the flywheel assembly 14. The L-shaped bracket 50 includes surfaces defined to mount gimbal bearings 56, and the axis passing through these bearings forms the gimbal axis (corresponding to the longitudinal axis "L" of the SGCMG) about which the flywheel housing 36 rotates. The L-bracket 50 includes a first end surface 51 and a second end surface 53, wherein the SGCMGs are arranged such that the first end surfaces collectively define an apex of the arrangement and the second end surfaces collectively define a base of the arrangement. The second surface 53 of the L-bracket 50 is secured to the gimbal housing 52 such as with fasteners and may be doweled in position. The first surface 51 of the L-bracket 50 may be configured to couple to the slip ring assembly 16; for example, the first surface may have two threaded holes on its top face on to which the slip ring brush 58 is mounted using screws. Furthermore, the first end surface 51 may define an opening 55 configured for receiving the first shaft 41 of the flywheel housing 36. The gimbal motor 54 is assembled onto the gimbal motor housing 52 and may be locked axially by a snap ring. Furthermore, the gimbal motor 54 may be coupled to the second end surface 53 and engaged with the second shaft 42 of the flywheel housing 36 such that the gimbal motor is configured to rotate the second shaft of the flywheel housing about the longitudinal axis of the SGCMG 10. As such, the flywheel assembly 12 is rotationally disposed between the first end surface 51 and the gimbal motor 54.

The gimbal motor housing 52 may also have a provision for mounting an inductive sensor 60 which may be required for initializing the angular position of the gimbal, as the gimbal is free to move during launch and will not start from the same angular position it was assembled in; the Hall effect sensor also does not function unless it has power supply which is cutoff during launch. Thus, the inductive sensor 60 may be used to provide information about the initial angular position of the gimbal. The L-bracket 50 also has interfaces for assembly of other SGCMGs and for mounting on to the satellite structure. For instance, the first end surface 51 may be configured to couple to a satellite bracket, while the second end surface 53 may be configured to couple to an IMU. The L-bracket 50 and the gimbal housing 52 may be made of a metal, such as aluminum, and optimized structurally for reducing mass. The structural components may be anodized to prevent galvanic corrosion at the bearing interface.

The gimbal bearings 56 are similar to the ones used in the flywheel assembly 12. For example, the bearings 56 may be made of ceramic (silicon nitride) balls and stainless steel races. There are two identical gimbal bearings 56—one mounted on the L-bracket 50 and the other on the gimbal motor housing 52. The axis through these bearings 56 corresponding to the gimbal axis or the longitudinal axis L of the SGCMG. The flywheel assembly 12 is mounted on the inner race of these bearings 56. In one embodiment, the bearings 56 run at a maximum speed of about 2 rad/s and are SKF 618/7-H bearings.

The slip ring assembly 16 is a device that allows continuous electrical connection between two parts which rotate relative to each other. The slip ring assembly 16 carries electrical signals required to run the flywheel motor 32, from the stationary part (with respect to the satellite) of the gimbal assembly 14 to the rotating flywheel assembly 12. This allows the endless motion of the flywheel assembly 12 about the gimbal axis and enables continuous control of the SGCMG 10. According to one embodiment, the slip ring assembly 16 consists of three channels with gold on gold contacts for low wear characteristics. The three channels are sufficient to drive the flywheel motor 32 through back e.m.f feedback. The rotor (rings) 47 and stator (brushes) 58 of the slip ring assembly are available in separate form providing the designer with the freedom of mounting without having to worry about the additional weight of the slip ring case and bearings. The rings of the slip ring are embedded on a plastic shaft and this shaft is mounted on the interface in the flywheel housing 36 (rotating part) while the brushes are mounted on the L-bracket 50 which is stationary. The wires from the slip ring rotor 47 are routed through the ports on the flywheel housing 36 to the motor 32. The electrical leads from the brushes 58 are connected to the motor controller.

The inductive sensor 60 is used to set a reference point for the angular position of the gimbal. Knowledge of this position is preferably known for precise feedback to the ACS. The Hall effect sensors in the gimbal motor 54 provide this information only when the motor is supplied with power. The flywheel housing 36 is mounted on bearings and is free to rotate during launch and handling operations; also the motor is not powered during these operations. Thus the initial angular position would be different from when it was assembled to when the satellite is in orbit. Using an inductive sensor to sense a predetermined high point on the surface of the flywheel housing 36 provides a reference to bring the gimbal to a known angular position before starting SGCMG operations. The inductive sensor facilitates providing an initial condition and the Hall sensors provide information on real time change of angular position. In one embodiment, the selected inductive sensor has a sensing range of about 0.8 mm, and a projection of about 0.7 mm on the external surface of the flywheel housing that can be sensed.

ACS Performance

As discussed above, the ACS unit preferably conforms to various constraints.

The performance of the SGCMG against the specifications discussed above are compared below.

1. Mass—The overall mass of the SGCMG was 580 g and exceeded the specification of 500 g. FIG. 44 gives a breakdown of the mass of all the components in the ACS.
2. Power—The SGCMG motors consumed about 1W each (8W for all 4 SGCMGs) which exceeds the specification of 3 W.
3. Volume—The SGCMG cluster could be accommodated in ½ U and thus meets the specification.
4. Torque—It was inferred from calculations based on the simulation discussed above that the SGCMGs were capable of producing a maximum torque of 0.8 Nmm and meets the specification.

SGCMG

Second Embodiment

Figure 19:
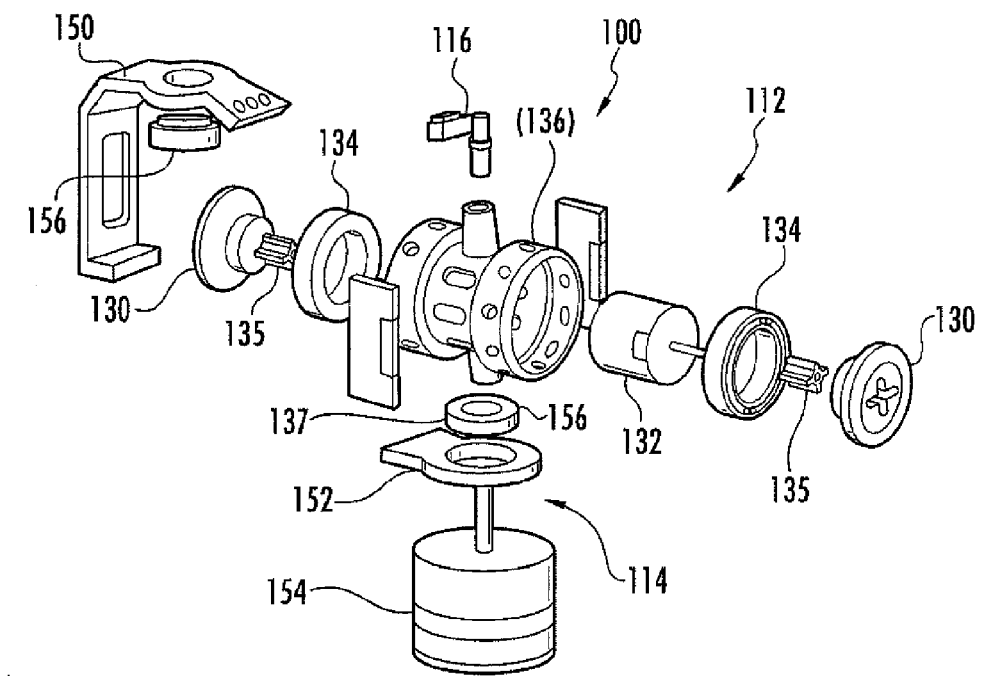
FIG. 19 illustrates an exploded view of a SGCMG according to another embodiment of the present invention.
Figure 20:
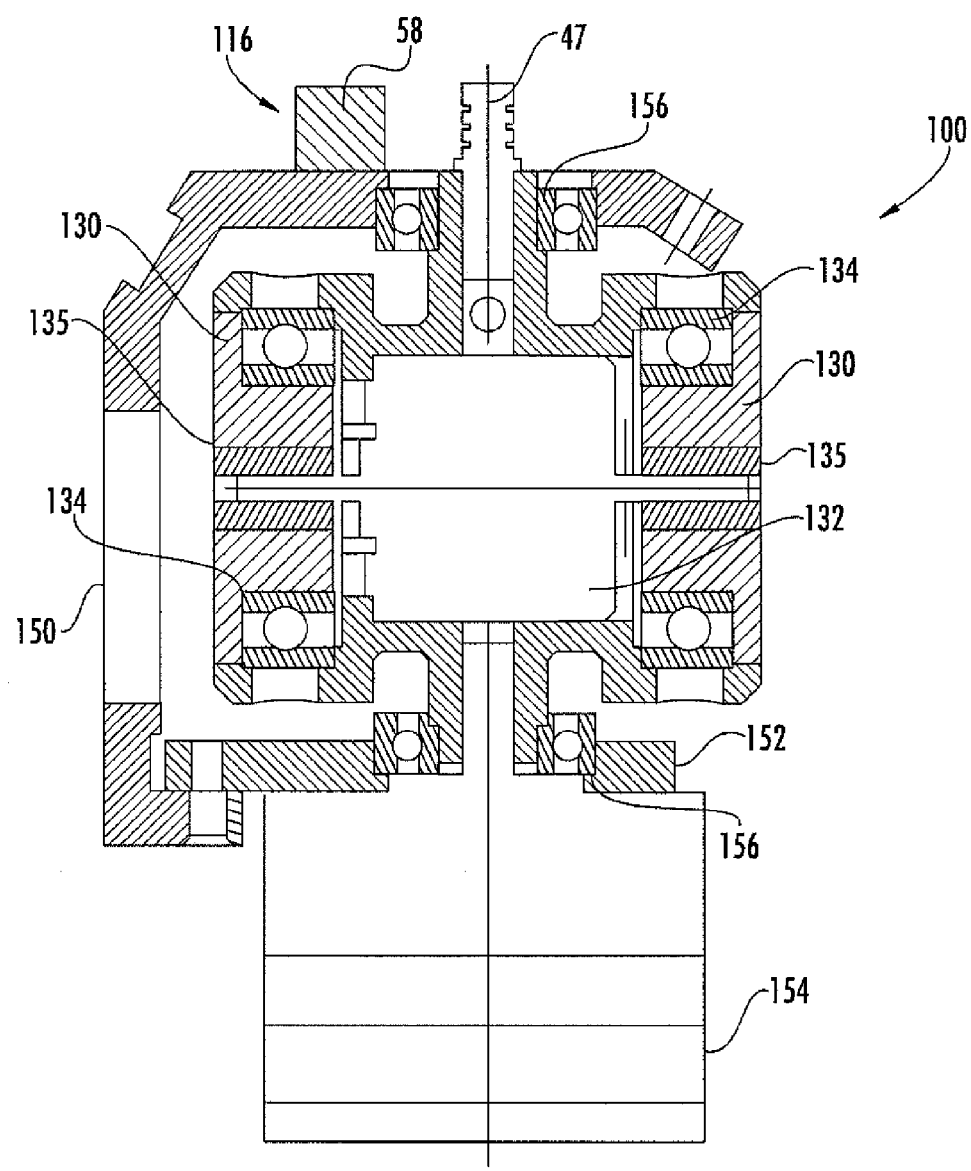
FIG. 20 depicts a cross-sectional view of the SGCMG shown in FIG. 19.

A second embodiment of a SGCMG 100 is shown in FIGS. 19-20. Generally, the SGCMG 100 includes:
 a) Flywheel housing (136)
 b) Flywheels (130)
 c) Flywheel motor (132)
 d) Flywheel bearings (134)
 e) Flexible couplings (135)
 f) Flywheel motor control boards (137)
 g) L-bracket (150)
 h) Gimbal motor mount plate (152)
 i) Gimbal bearings (156)
 j) Gimbal motor with integrated encoder (154)
 k) Slip ring assembly (116)

The first six components form the flywheel assembly 112 while the remaining components form the gimbal assembly 114.

Flywheel Assembly

Figure 21:
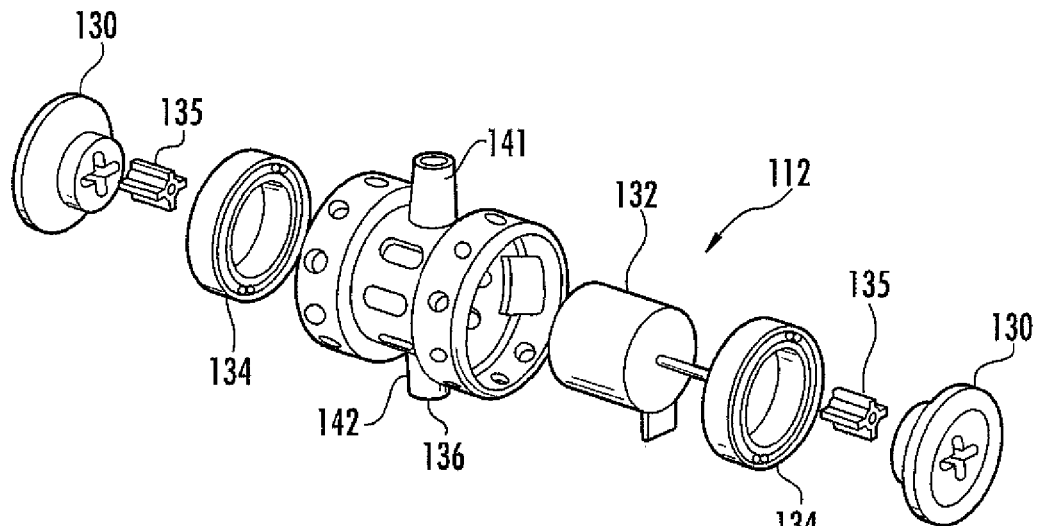
FIG. 21 shows an exploded view of a flywheel assembly of the SGCMG shown in FIG. 19.
Figure 22:
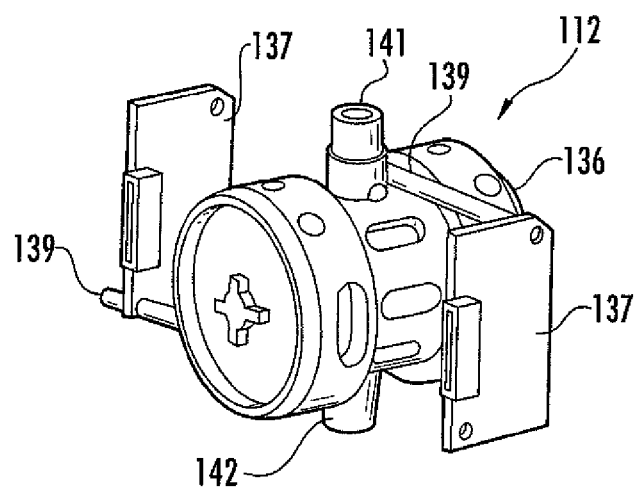
FIG. 22 illustrates a perspective view of the flywheel assembly shown in FIG. 19 including a plurality of motor driver boards.

An exploded view of the flywheel assembly 112 is shown in FIG. 21. The construction of the flywheel housing 136 is similar to the flywheel housing 36 described above but with some modifications to accommodate the new motor 132 and flywheels 130. The SGCMG 100 is smaller in size, accommodates two flywheels 130 and has a central plate for the motor mount. The flywheel motor 132 is face mounted inside the flywheel housing 136 using a plurality of fasteners, such as four M1.6 screws. Identical flywheels 130 may be mounted on either side of the motor 132 on the inner races of the flywheel bearings 134. The motion from the motor shaft to the flywheel 130 is transmitted through flexible couplings 135. The flexible couplings 135 may include splined shafts that are press fit onto the motor shaft. The flywheels 130 are located on bearings 134 and do not impart any load on the motor bearings. The flywheels 130 and the flexible coupling 135 may be made of a metal material, such as stainless steel. The bearings 134 chosen may have the same duty cycle and be similar to bearings 34 described above except for differences in size. According to one embodiment, the bearings 134 are two SKF 61801-H silicon nitride ceramic ball bearings. The entire flywheel assembly 112 along with the flywheel housing 136 may be balanced on a precision balancing machine. One or more motor driver boards 137 may also be mounted on the flywheel housing 136, as shown in FIG. 22. The motor driver boards 137 may be built on two separate identically sized printed circuit boards (PCBs). These two boards 137 are coupled to the outer cylindrical surface of the flywheel housing 136 such as using studs 139.

The flywheel assembly 112 employs a frameless motor 132. Exemplary advantages of using a frameless motor were explained above. For example, a framed BLDC motor with a double ended shaft was considered. This motor was selected instead of a single shaft to maximize the inertia by using two flywheels and avoid a cantilever situation. One exemplary motor 132 suitable for this purpose is a Minebea double ended BLDC motor. With a double ended shaft design, two identical flywheels 130 supported by bearings 134 are mounted on to both ends of the shaft via flexible couplings 135. This configuration may minimize the load on the motor bearings caused by misalignment of motor bearing and flywheel axes. The motor 132 may have a flexible printed circuit (FPC) lead that mates with FPC connector on the motor driver board 137.

Figure 24:
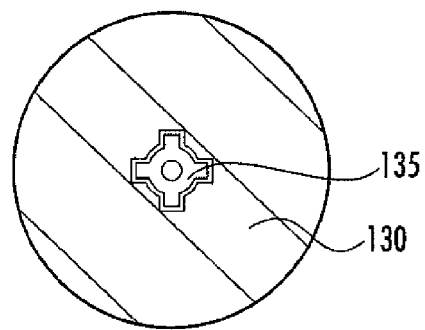
FIG. 24 is a cross-sectional view of the flywheel and flexible coupling assembly shown in FIG. 19.

The framed BLDC motor 132 for the flywheel 130 has its own set of bearings but cannot support the flywheel during launch, hence the flywheels are supported on an additional set of bearings 134. This arrangement may introduce some misalignment between the axes of the motor shaft and bearings 134. The misalignment could be detrimental to the motor bearings over a period of time and may also cause additional friction torque on the motor 132. Hence, the motion from the motor 132 should be transmitted to the flywheels 130 through a compliant medium like a flexible coupling 135 (see FIG. 24). The coupling 135 is similar to a claw coupling but with larger spacing between the claws and may also have a silicone filling in the gaps. For example, the silicone, such as Nusil CV-1142, may have high shear strength but very low compressive strength and absorbs the effects of misalignment. The silicone is highly viscous and can be placed into the gap, such as by injecting the silicone using a syringe with a needle orifice diameter of 1 mm.

The SGCMG 10 had the motor drivers for the flywheel motor 30 located external thereto, and the motor had to be controlled using back EMF feedback as the slip rings had only three channels. Precise speed control without the use of Hall sensors was not possible because of noisy feedback in back EMF control. Therefore, the motor driver board 137 was miniaturized to be mounted on the rotating flywheel assembly 112 itself. By doing so, the motor 132 can be driven with the feedback from the Hall sensors. Two channels of slip ring assembly 116 provide power to the controller and the other one is used as a feedback line to measure the speed of the motor 132. The FPC from the motor 132 is connected to one of the driver boards 137 and there is a wired connection between the two boards routed around the housing 136. The wire routing is carefully done to avoid interference with any non-rotating parts.

Gimbal Assembly

Figure 25:
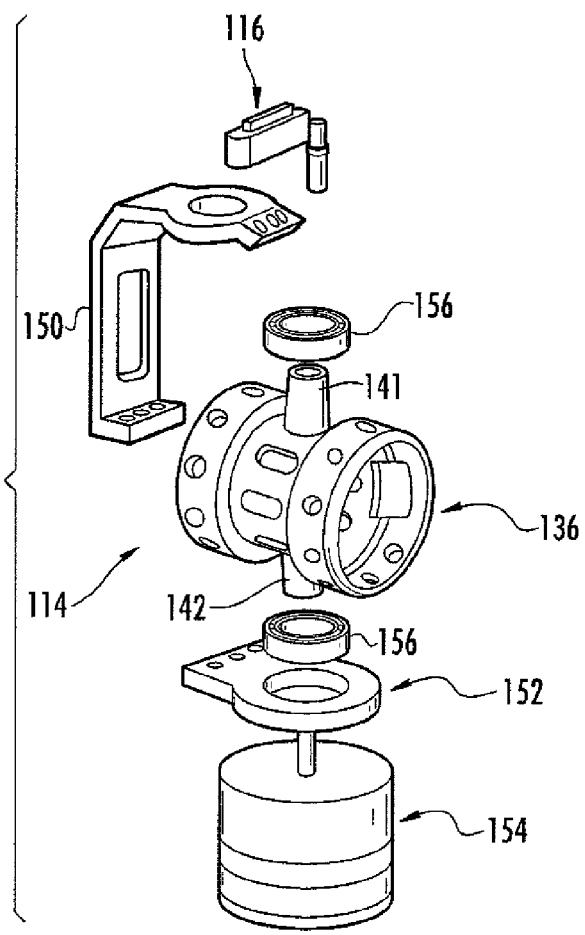
FIG. 25 is an exploded view of a gimbal assembly of the SGCMG shown in FIG. 19.

The exploded view of the gimbal assembly 114 is shown in FIG. 25. The gimbal assembly 114 in this design is different than the gimbal assembly 14 discussed previously in that a brushed DC gear motor 154 as opposed to a frameless BLDC motor is used. The output shaft of the gear motor 154 is press fit into the second shaft 142 in the flywheel housing 136. The gimbal assembly 114 also has an L-bracket 150 and a simplified gimbal motor plate 152 as the motor 154 has its own frame. Misalignment between the motor shaft bearings and the gimbal bearings 156 is not a concern because of the low rotational speed of the gimbal. This design also eliminates the need to use an inductive sensor as the DC motor has an integrated encoder. The gimbal bearings 156 are similar to the bearings 56 discussed above with the exception of differences in size. For example, the bearings 156 may be SKF 618/6-H silicon nitride ceramic ball bearings.

Since the gimbal speeds are very low, a brushed DC gear motor 154 with an integrated encoder was considered for the gimbal motor 154. According to one embodiment, the motor 154 operates in the range of 3-6 V and consumes a power of 0.2-0.3 W during operation at 5V. The motor 154 may have an integrated incremental encoder. The gearbox may be in line with the motor 154 and have a gear ratio such as 1:33. Due to the high gear ratio, the gimbal inertia cannot back drive the motor 154 during launch. This assures that the gimbal will maintain its orientation about the gimbal axis and will not be disturbed by the launch loads. Thus, an inductive sensor is not needed to determine the angular position and realign the gimbals.

Prototype—Experimental Testing

Figure 26:
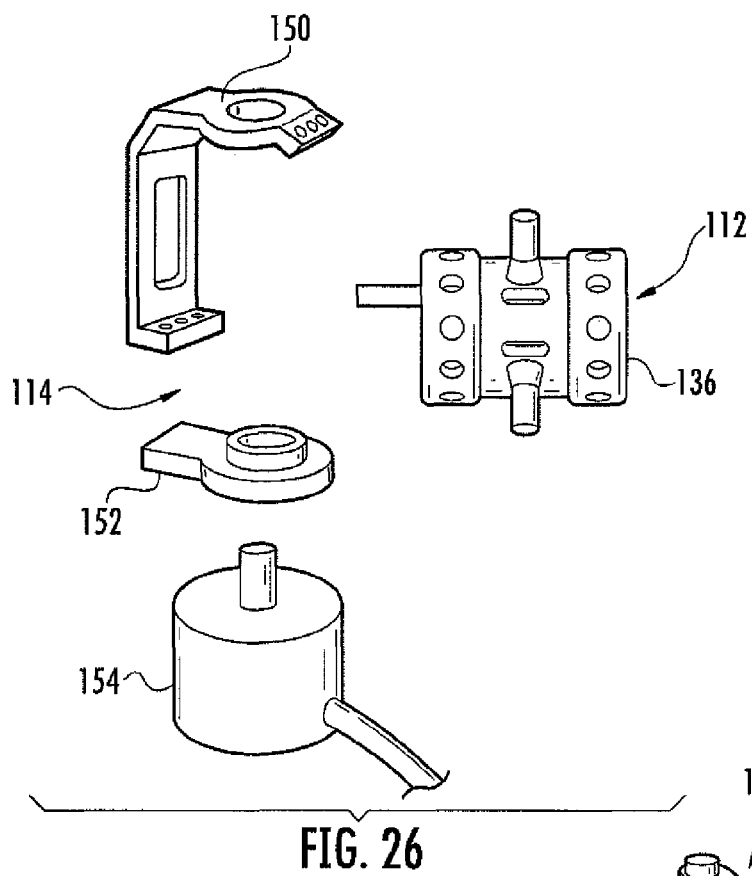
FIG. 26 is an exploded view of a prototype of a SGCMG according to one embodiment.
Figure 27:
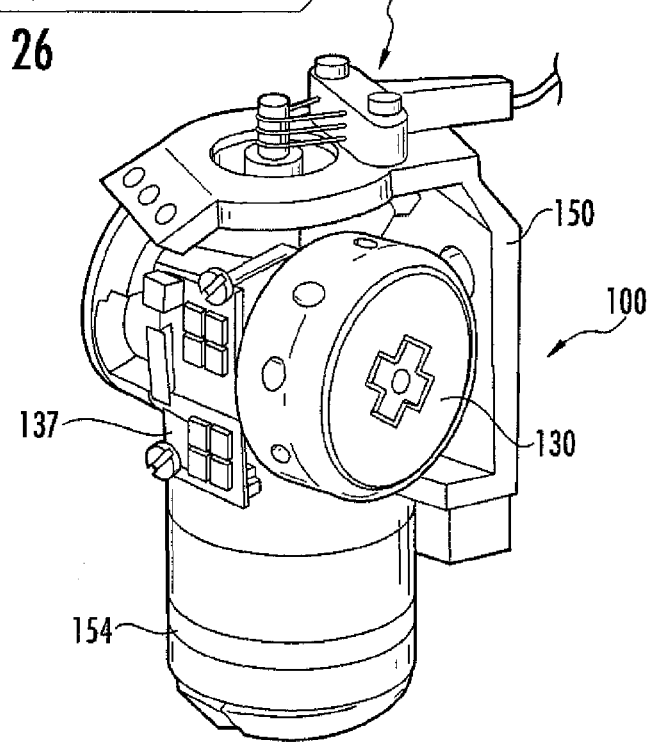
FIG. 27 is a perspective view of the assembled SGCMG shown in FIG. 26.

A prototype SGCMG was built for further testing and development, as shown in FIGS. 26-27. The structural components of the SGCMG were made of aluminum 6061-T6 grade. The free running of the flywheel 130 was tested after the flywheel was first assembled, but the motor 132 was not able to spin the flywheels due to the drag caused by the grease in the bearings 134. The flywheel assembly 114 was disassembled; the bearings were washed free of the grease using acetone and assembled again. This rectified the problem and the flywheel performance was further tested for its current draw over a period of 90 minutes. The motor was damaged during the re-assembly and hence started drawing more current (85 mA) as opposed to its actual value of 35 mA. The total current draw of the flywheel assembly 114 was 101 mA, which demonstrates that the total current drawn by the bearing friction is about 16 mA.

The estimated and achieved value of the mass is tabulated in FIG. 45. The total mass of the SGCMGs and controller is within the target value of less than 500 g. The savings in mass as compared to the previous design were due to a smaller flywheel motor, redesigned gimbal motor housing, and a flywheel housing 136 with more lightening holes.

The performance of the SGCMG as against the specifications discussed above are compared below.
1. Mass—The overall mass of the SGCMG was 437 g and meets the specification of 500 g.
2. Power—The SGCMG motors consume about less than 0.4 W each (3.2 W peak for all 4 CMGs) which is close to the specification of 3 W.
3. Volume—The SGCMG cluster could be accommodated in ½ U and thus meets the specification.
4. Torque—It was inferred from the simulation discussed above that the SGCMGs were capable of producing a maximum torque of 0.8 Nmm and meets the specification.

ACS Simulations

Figure 28:
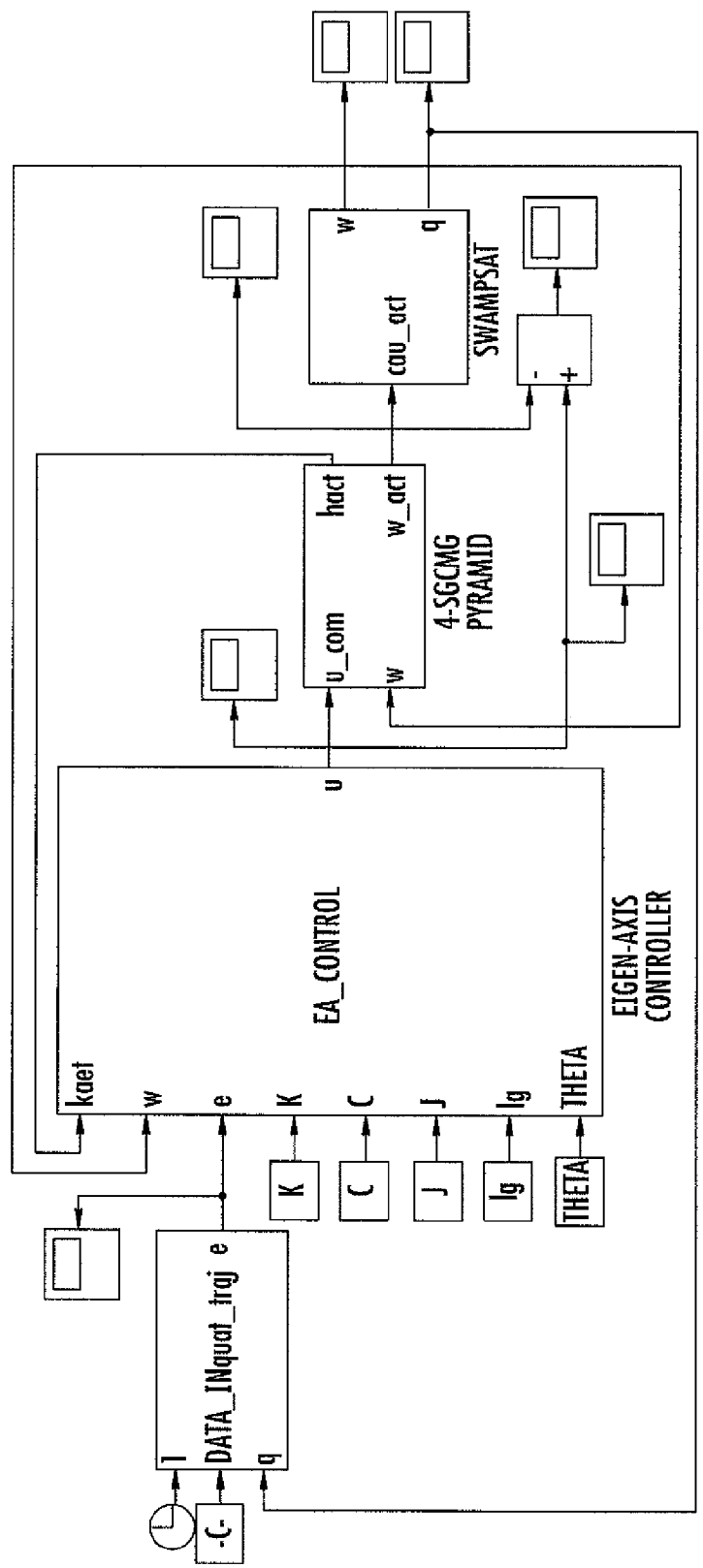
FIG. 28 is a diagram of an ACS simulation according to one embodiment.

Two numerical simulations were performed on the prototype for the attitude dynamics of the satellite using Simulink, as illustrated by the model shown in FIG. 28. The purpose of these simulations was to test the SGCMGs under ideal conditions and its performance using the steering logic chosen. The first simulation was a quaternion regulation problem and the second simulation was for tracking a quaternion trajectory representative of the Sun-pointing mission of the satellite. The simulation parameters and initial conditions used for both simulations are given in FIG. 46.

Quaternion Regulation

Figure 29:
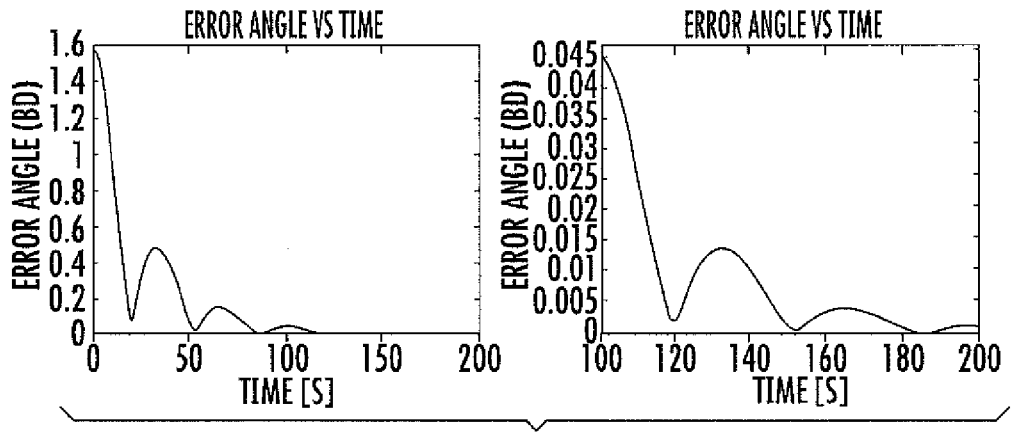
FIGS. 29-34 illustrate graphical results of the ACS simulation depicted in FIG. 28.
Figure 30:
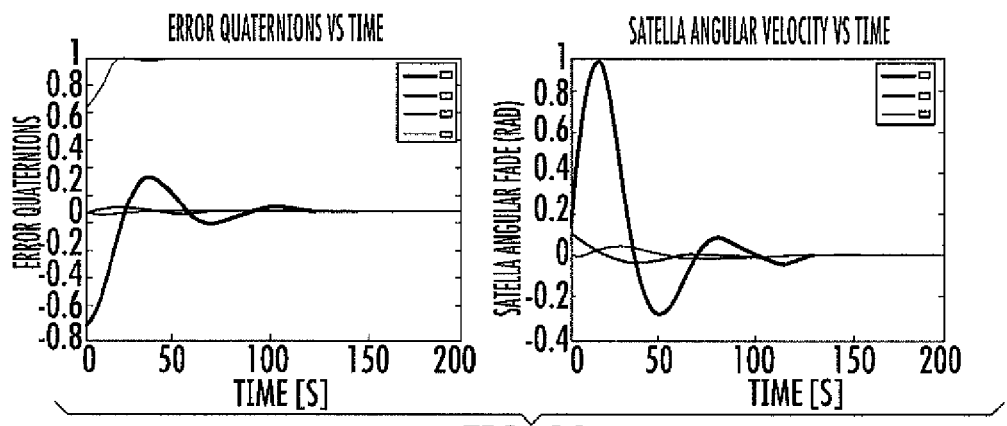
Figure 31:
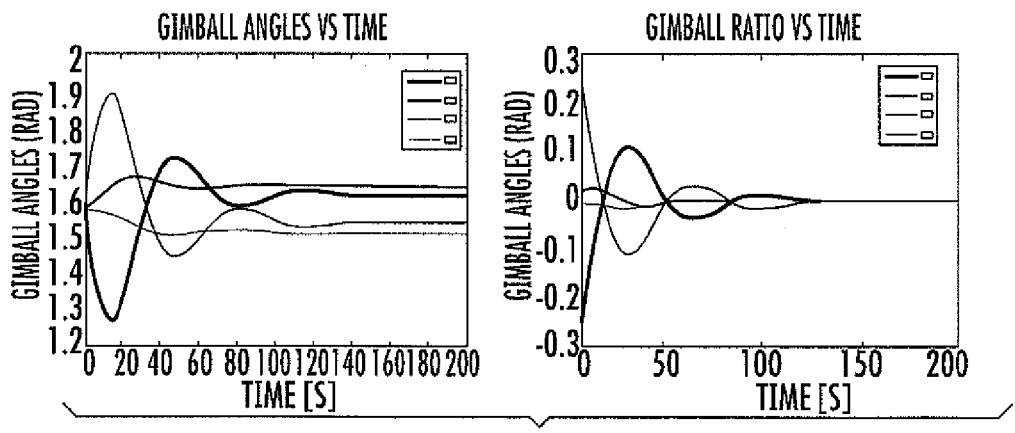

The first set of results showed that, under the given control gains, the ACS was able to perform a 90° maneuver and get within 1° accuracy in about two minutes as shown in FIGS. 29-30. Further control tuning will be done when the Simulink model is expanded to include more fidelity. The gains chosen proved to be conservative as evidenced by the magnitudes of the gimbal rates in FIG. 31. It should also be noted that different results are expected for different initial gimbal angles. In the case presented here, the ACS is initially not at singularity, thus it is able to provide the torque commanded.

Quaternion Tracking

Figure 32:
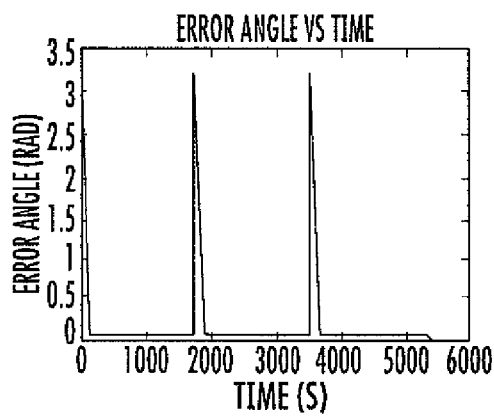
Figure 33:
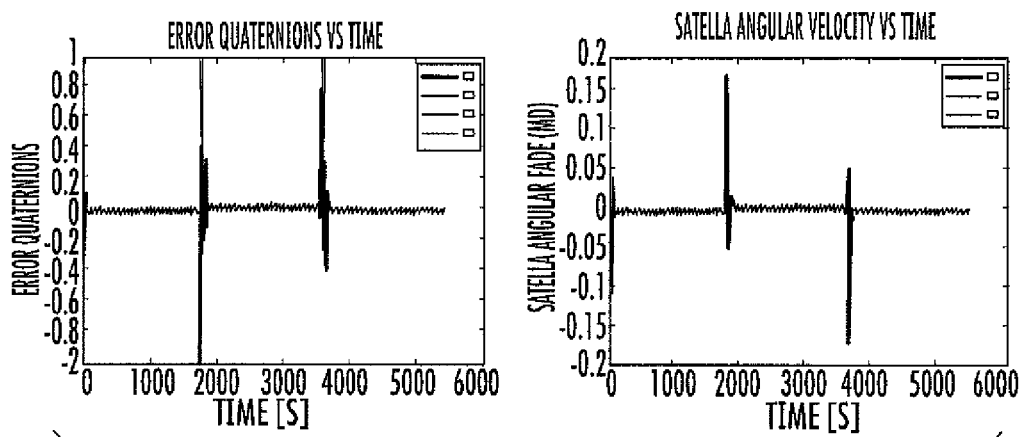
Figure 34:
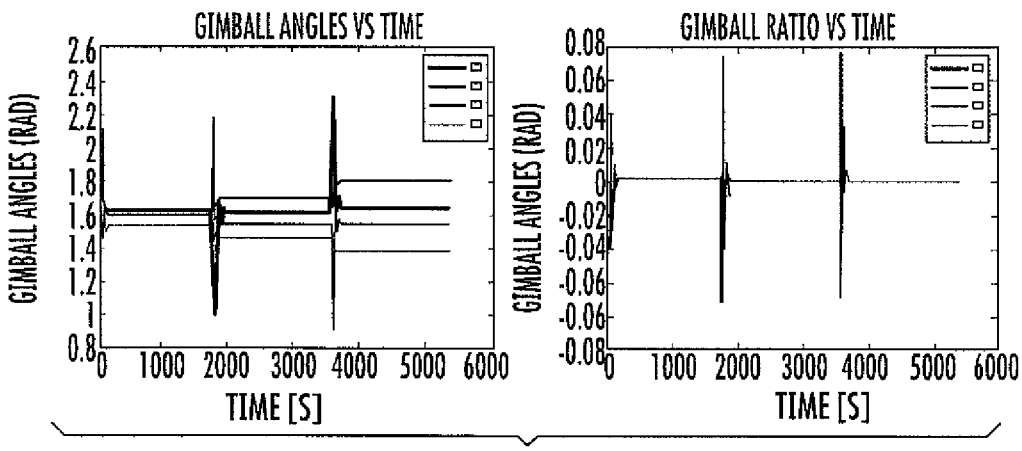

For the second set of results, the quaternion trajectory was obtained from STK for an orbit with classical orbital parameters shown in FIG. 47. The quaternion trajectory generated is a set of waypoints spaced in 60 second intervals. The second set of results showed that the ACS was able to track the entire trajectory within 1° accuracy. The slight jumps every 60 seconds shown in FIGS. 32-34 represent change in quaternion waypoint being tracked. Again, further control tuning can be done for obtaining more aggressive gimbal rates and in turn get better tracking performance.

SGCMG

Third Embodiment

Figure 35:
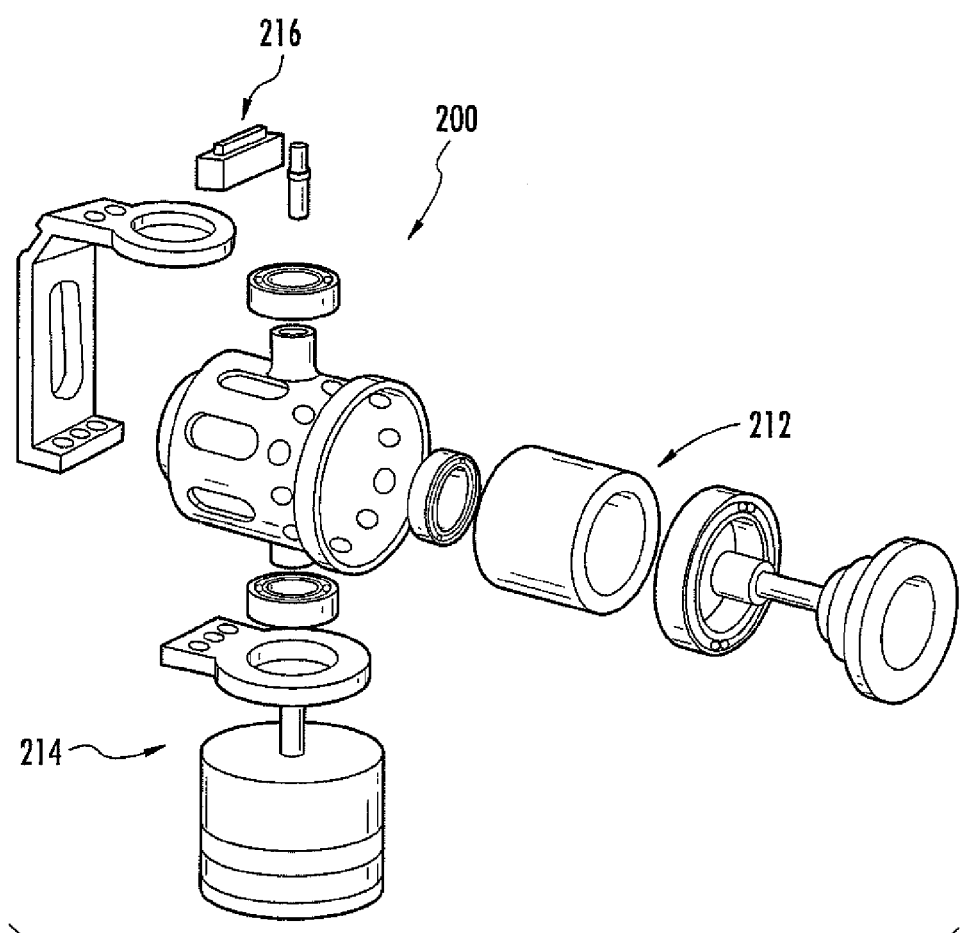
FIG. 35 illustrates an exploded view of a SGCMG according to another embodiment of the present invention.

A third embodiment of a SGCMG 200 is shown in FIG. 35, which is a hybrid of the SGCMGs 10, 100 discussed above. The SGCMG 200 was considered to produce more torque for using them in larger satellites (e.g., nano-satellites) [12]. The mass and volume constraints of 500 g and ½ U were still considered applicable. But the power constraint of 3 W was relaxed assuming more power availability in larger satellites. A frameless motor 232, such as a Kollmorgen motor, was again considered for the flywheel assembly 212, while a brushed DC gear motor 254, such as the Micromo 2619 series DC gear motor, was used for the gimbal assembly 214.

The following are the specifications of the hybrid design:
1. Mass: <500 g
2. Volume: ½ U (100×100×50 mm$^3$)
3. Power: 6 W
4. Flywheel speed: 10000 rpm
5. Maximum gimbal speed: 1 rad/s
6. Torque: 3 Nmm The torque produced by SGCMG 200 is sufficient for the ACS of a nano satellite whose mass is less than 12 Kg and occupies a volume less than 300×200×100 mm$^3$. Since the volume and the mass constraints were maintained as per the previous iterations, the design can also be used for a satellite, such as a CubeSat.

ACS and Control Systems

As discussed above, the ACS is the scientific payload of the satellite and, in one embodiment, occupies of a volume of less than about ½ U of the satellite (see FIGS. 2 and 3). The remaining volume of the satellite may be used to package the electronics of the system including the electrical power systems (EPS), communication system (COMMS), command and data handling system (CDH), and the attitude determination system (ADS). In a 3 U configuration, the remaining 2 Us can be used to package the payload.

Figure 37:
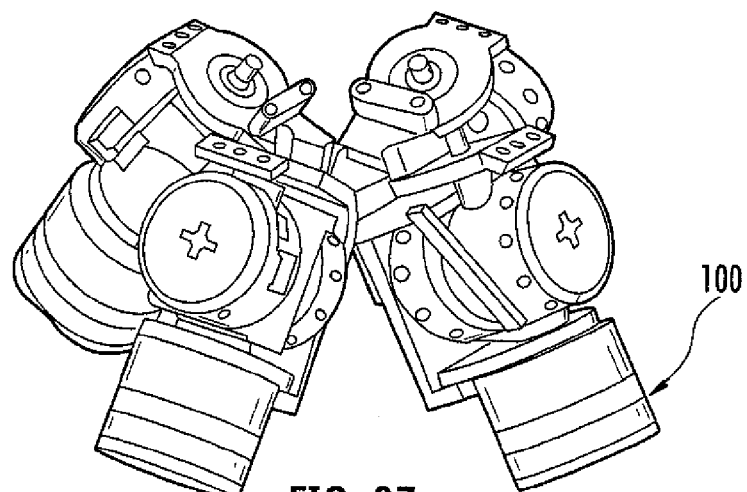
FIG. 37 is a perspective view of the SGCMGs housed within the ACS shown in FIG. 36.
Figure 38:
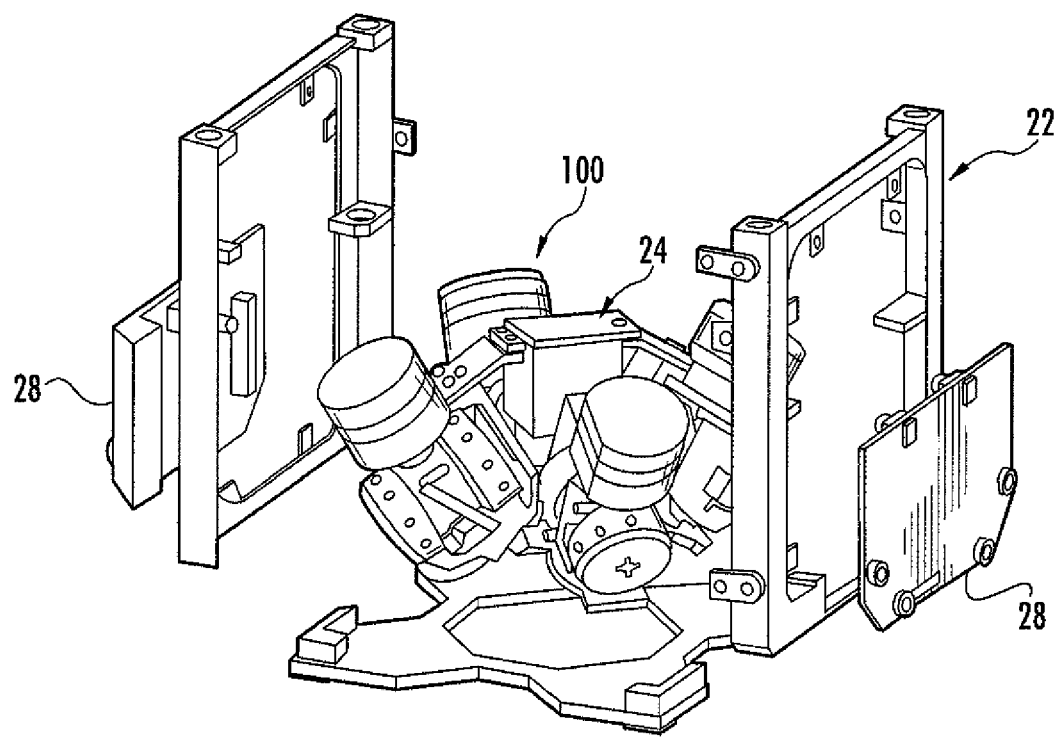
FIG. 38 is an exploded view of the ACS shown in FIG. 36.

FIG. 36 illustrates one embodiment of an ACS, wherein FIG. 37 shows the SGCMG assembly and FIG. 38 shows an exploded view of the ACS. FIGS. 36-38 show that the SGCMGs are arranged in a pyramidal configuration and are completely enclosed within a housing. As also discussed above, the ACS preferably conforms to various design specifications, such as size, mass, and power specifications. The ACS may also be configured to meet additional performance specifications. For example, the ACS may be configured to satisfy the following specifications:

Slew to point the "−Z" axis at the Sun.
Settle "−Z" axis at the Sun for 2 minutes.
Dwell(Track) "−Z" axis on the Sun for 10 minutes.
Slew 180° to point the face normal to "+Z" axis at the Sun.
Slew 180° to point the face normal to "−Z" axis at the Sun.
Settle "−Z" axis at the Sun for 2 minutes.
Dwell (Track) "−Z" axis on the Sun for 10 minutes.
Point −Z towards the Sun continuously over an orbit.

Thus, the ACS may be configured to adhere to various design and performance specifications for use with pico- and nano-satellites.

FIGS. 39-40 illustrate exemplary embodiments of subsystems and interconnections therebetween that facilitate meeting such specifications. For example, FIGS. 39 and 40 depict various subsystems that may be used in conjunction with the satellite, which may include the ACS, ADS, various Structures and Mechanisms, EPS, Telemetry, Tracking, and Command (COMMS), and CDH. Moreover, FIG. 41 shows the control system for an ACS according to one embodiment. In this regard, the ACS may include various components for controlling the satellite. For instance, the ACS may include:

A plurality of SGCMGs arranged in a pyramidal arrangement
Flywheel motor control board
Gimbal motor control boards and digital signal controller
Flywheel speed sensor
Gimbal position sensor
Attitude feedback system
SGCMG control software and steering logic
Satellite attitude control software Together, these components of the ACS cooperate to control the attitude of the satellite. Moreover, FIG. 41 demonstrates that the ACS includes a processor (e.g., master driver board) for controlling the plurality of SGCMGs, wherein the processor contains control and feedback algorithms for communicating with the SGCMGs and other attitude determination subsystems (e.g., IMU, sun sensors, and magnetometer) for controlling the attitude of the satellite. Thus, the ACS provides a unitized system that coordinates communication and control of various subsystems of the satellite.

CONCLUSION

Embodiments of the present invention may provide several advantages. For example, the SGCMGs are capable of rapid retargeting and attitude control of small satellites, such as pico and nano-satellites. Moreover, the SGCMGs are compact and are capable of meeting mass, power, and volume constraints for use with these small satellites. In addition, the SGCMGs may be used in conjunction with an ACS for three-axis attitude control, which may be embodied as "a black box" ACS that can be integrated for use on small satellites. This black-box ACS may lower the subsystem complexity, which benefits satellite developers in the industry.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended inventive concepts. Although specific terms are employed herein, they are used in a generic and descriptive sense only and not for purposes of limitation.

REFERENCES CITED

[1] K. Baker and D. Jansson, "Space satellites from the world's garage—the store of amsat," Proceedings of the IEEE 1994 National Aerospace and Electronics Conference, pp. 1174-1181, 1994.
[2] B. Larsen et al., "Microcontroller design for the Montana earth orbiting pico-explorer (merope) cubesat-class satellite," Aerospace Conference Proceedings, vol. 1, 2002.
[3] S. Waydo et al., "Cubesat design for leo-based earth science missions," Aerospace Conference Proceedings, vol. 1, 2002.
[4] M. Long et al., "A cubsat derived design for a unique academic research mission in earthquake signature detection," AMA Small Satellite Conference, 2003.
[5] L. Alminde et al., "The aaucubesat student satellite project: architectural overview and lessons learned," $16^{th}$ IFAC Symposium on Automatic Control in Aerospace (Russia), 2004.
[6] B. Twiggs and J. Puig-Suari, "Cubesat design specifications document," tech. rep., Stanford University and California Polytechnic State University, 2004.
[7] K. Svartveit, "Attitude determination of the ncube satellite," tech. rep., Department of Engineering Cybernetics—Norwegian University of Science and Technology, 2003.
[8] Kurukowa, H., "A Geometric Study of Control Moment Gyroscopes," PhD Thesis, University of Tokyo, 1998.
[9] G. Margulies and J. Aubrun, "Geometric Theory of Single-Gimbal Control Moment Gyro Systems," Journal of the Astronautical Sciences, Vol. 26, No. 2, 1978, pp. 159-191.
[10] W. Lan, "Poly picosatellite orbital deployer mk iii icd," tech. rep., California Polytechnic State University, 2007.
[11] V. Nagabhushan and N. Fitz-Coy, "Split Flywheel Design with Attitude Jitter Minimization Through Flywheel Phase Control," AIAA@Infotech, Seattle 2009.
[12] V. Nagabhushan, "Development Of Control Moment Gyroscopes For Attitude Control of Small Satellites," Master's Thesis, University of Florida, 2009.
[13] B. Wie et al., "Quaternion Feedback Regulator for Spaecraft Eigenaxis Rotations," Journal of Guidance, Control, and Dynamics, vol. 12, no. 3, 1989, pp 375-380.
[14] B. Wie et al., "Singularity Robust Steering Logic for Redundant Single-Gimbal Control Moment Gyros," Journal of Guidance, Control, and Dynamics, vol. 24, no. 5, 2001, pp. 865-872.

That which is claimed:

1. An attitude control system (ACS) for use with a pico- or a nano-satellite comprising:
   a plurality of single-gimbaled control moment gyroscopes (SGCMGs) arranged in a pyramidal configuration and operable to provide three-axis attitude control of the satellite, wherein each SGCMG defines a longitudinal axis with a first end and a second end, wherein the longitudinal axis of each SGCMG aligns with a respective side of the pyramidal configuration, and wherein the first ends of the plurality of SGCMGs are arranged to converge near a top portion of the pyramidal configuration to form a compact form factor, wherein each SGCMG comprises:
      a flywheel assembly comprising:
         a flywheel housing, wherein the flywheel housing of the flywheel assembly defines a first shaft and a second shaft, each shaft extending from an exterior of the flywheel housing along the longitudinal axis of the SGCMG, the first shaft extending from a first side of the flywheel housing and the second shaft extending from a radially opposite second side of the flywheel housing;
         at least one flywheel rotationally disposed within the flywheel housing; and
         a flywheel motor configured to drive the flywheel via a drive shaft of the flywheel,
         wherein the drive shaft of the flywheel has a rotational axis oriented substantially perpendicular to the longitudinal axis extending through the SGCMG; and
      a gimbal assembly comprising:
         a bracket defining an L-shape and comprising a first end surface and a second end surface, wherein the first end surface of the bracket defines a first opening configured for receiving the first shaft of the flywheel housing; and
         a gimbal motor having a rotational axis oriented substantially co-axial to the longitudinal axis of the SGCMG, wherein the gimbal motor is engaged with the second shaft of the flywheel housing, the gimbal motor coupled to the second end surface and configured for rotating the second shaft of the flywheel assembly about the longitudinal axis of the SGCMG and between the first end surface and the gimbal motor,
         wherein the flywheel assembly is rotationally disposed between the first end surface and the gimbal motor when the first shaft is engaged within the first opening and the second shaft is engaged with the gimbal motor.

2. The system of claim 1 wherein the plurality of SGCMGs consists of four SGCMGs arranged in a rectangular pyramidal configuration with respect to one another.

3. The system of claim 1, wherein the longitudinal axis of each of the SGCMGs extends at an angle of approximately 40 degrees with respect to a central axis extending between the arrangement of SGCMGs.

4. The system of claim 1, wherein:
a central longitudinal axis extending between the pyramidal arrangement of SGCMGs comprises a first end and a second end,
an apex of the arrangement is disposed adjacent the first end of the longitudinal axis of the pyramidal arrangement of SGCMGs,
a base of the arrangement is disposed adjacent the second end of the longitudinal axis of the pyramidal arrangement of SGCMGs,
the first end surface of the bracket of each gimbal assembly is disposed adjacent the apex of the arrangement, and
the second end surface of the bracket of each gimbal assembly is disposed adjacent the base of the arrangement.

5. The system of claim 1, further comprising a slip ring assembly coupled to the first end surface of the bracket for providing electrical power and feedback to the flywheel assembly.

6. The system of claim 1, wherein at least one of the flywheel motor or the gimbal motor comprises a framed DC motor.

7. The system of claim 1, wherein at least one of the flywheel motor or the gimbal motor comprises a frameless DC motor.

8. The system of claim 1, further comprising a gimbal plate disposed between the second end surface of the bracket and the gimbal motor and configured to engage both the second end surface of the bracket and the gimbal motor.

9. The system of claim 1, further comprising at least one flywheel motor driver board coupled to the flywheel assembly such that the flywheel motor driver board is configured to rotate with the flywheel assembly.

10. The system of claim 9, further comprising a pair of flywheel motor driver boards coupled to the flywheel assembly and one another such that the flywheel motor driver boards are configured to rotate with the flywheel assembly.

11. The system of claim 1, further comprising an inertial measurement unit integrated with the plurality of SGCMGs.

12. The system of claim 1, further comprising a processor for controlling the plurality of SGCMGs, wherein the processor contains control and feedback algorithms for controlling the attitude of the satellite and steering logics for controlling the SGCMGs.

13. The system of claim 1, wherein the ACS is entirely disposed within an interior portion of a housing of the satellite.

14. The system of claim 1, wherein the ACS occupies a volume of less than 100 mm.times.100 mm.times.50 mm of the satellite and has a mass less than 500 grams, wherein a total power consumption of the ACS is less than 3 watts, wherein each of SGCMGs are configured to generate a torque of at least 0.75 Nmm.

15. A single-gimbaled control moment gyroscope (SGCMG) configured for arrangement into a pyramidal configuration with a plurality of other SGCMGs to provide three-axis attitude control of a satellite, wherein the SGCMG defines a longitudinal axis with a first end and a second end, wherein the longitudinal axis of the SGCMG is configured to align with a side of the pyramidal configuration, and wherein the first end of the SGCMG is configured to be arranged near a top portion of the pyramidal configuration to converge with respective first ends of the other SGCMGs to form a compact form factor, the SGCMG comprising:
a flywheel assembly comprising:
a flywheel housing, wherein the flywheel housing of the flywheel assembly defines a first shaft and a second shaft, each shaft extending from an exterior of the flywheel housing along the longitudinal axis of the SGCMG, the first shaft extending from a first side of the flywheel housing and the second shaft extending from a radially opposite second side of the flywheel housing;
at least one flywheel rotationally disposed within the flywheel housing; and
a flywheel motor configured to drive the flywheel via a drive shaft of the flywheel,
wherein the drive shaft of the flywheel has a rotational axis oriented substantially perpendicular to the longitudinal axis extending through the SGCMG; and
a gimbal assembly comprising:
an L-shaped bracket comprising a first end surface and a second end surface, wherein the first end surface of the bracket defines a first opening configured for receiving the first shaft of the flywheel housing; and
a gimbal motor having a rotational axis oriented substantially co-axial to the longitudinal axis of the SGCMG, wherein the gimbal motor is engaged with the second shaft of the flywheel housing, the gimbal motor coupled to the second end surface and configured for rotating the second shaft of the flywheel assembly about the longitudinal axis of the SGCMG and between the first end surface and the gimbal motor,
wherein the flywheel assembly is rotationally disposed between the first end surface and the gimbal motor when the first shaft is engaged within the first opening and the second shaft is engaged with the gimbal motor.

16. A single-gimbaled control moment gyroscope (SGCMG) configured for arrangement into a pyramidal configuration with a plurality of other SGCMGs to provide three-axis attitude control of a satellite, wherein the SGCMG defines a longitudinal axis with a first end and a second end, wherein the longitudinal axis of the SGCMG is configured to align with a side of the pyramidal configuration, and wherein the first end of the SGCMG is configured to be arranged near a top portion of the pyramidal configuration to converge with respective first ends of the other SGCMGs to form a compact form factor, the SGCMG comprising:
a flywheel assembly comprising:
a flywheel housing, wherein the flywheel housing of the flywheel assembly defines a first shaft and a second shaft, each shaft extending from an exterior of the flywheel housing along the longitudinal axis of the SGCMG, the first shaft extending from a first side of the flywheel housing and the second shaft extending from a radially opposite second side of the flywheel housing;
at least one flywheel rotationally disposed within the flywheel housing;
a flywheel motor configured to drive the flywheel via a drive shaft of the flywheel; and
at least one flywheel motor driver board coupled to the flywheel housing, wherein the drive shaft of the flywheel has a rotational axis oriented substantially perpendicular to the longitudinal axis extending through the SGCMG; and
a gimbal assembly comprising:
a bracket comprising a first end surface and a second end surface, wherein the first end surface of the bracket defines a first opening configured for receiving the first shaft of the flywheel housing; and a gimbal motor having a rotational axis oriented substantially co-axial to the longitudinal axis of the SGCMG, the gimbal motor coupled to the second end surface and configured for rotating the flywheel assembly about the longitudinal axis of the SGCMG and between the first end surface and the gimbal motor, wherein the flywheel motor driver board is configured to rotate with the flywheel assembly, the flywheel assembly being rotationally disposed between the first end surface and the gimbal motor when the first shaft is engaged within the first opening and the second shaft is engaged with the gimbal motor.

17. A method for providing three-axis attitude control of a pico- or a nano-satellite comprising:

providing an attitude control system (ACS) comprising a plurality of single-gimbaled control moment gyroscopes (SGCMG) arranged in a pyramidal configuration, wherein each SGCMG defines a longitudinal axis with a first end and a second end, wherein the longitudinal axis of each SGCMG aligns with a respective side of the pyramidal configuration, and wherein the first ends of the plurality of SGCMGs are arranged to converge near a top portion of the pyramidal configuration to form a compact form factor, wherein each SGCMG comprises:

a flywheel assembly comprising:

a flywheel housing, wherein the flywheel housing of the flywheel assembly defines a first shaft and a second shaft, each shaft extending from an exterior of the flywheel housing along the longitudinal axis of the SGCMG, the first shaft extending from a first side of the flywheel housing and the second shaft extending from a radially opposite second side of the flywheel housing;

at least one flywheel rotationally disposed within the flywheel housing; and a flywheel motor configured to drive the flywheel via a drive shaft of the flywheel, wherein the drive shaft of the flywheel has a rotational axis oriented substantially perpendicular to the longitudinal axis extending through the SGCMG; and a gimbal assembly comprising:

an L-shaped bracket comprising a first end surface and a second end surface, wherein the first end surface of the bracket defines a first opening configured for receiving the first shaft of the flywheel housing; and a gimbal motor having a rotational axis oriented substantially co-axial to the longitudinal axis of the SGCMG, wherein the gimbal motor is engaged with the second shaft of the flywheel housing, the gimbal motor coupled to the second end surface and configured for rotating the second shaft of the flywheel assembly about the longitudinal axis of the SGCMG and between the first end surface and the gimbal motor, wherein the flywheel assembly is rotationally disposed between the first end surface and the gimbal motor when the first shaft is engaged within the first opening and the second shaft is engaged with the gimbal motor; and controlling the SGCMGs to produce a net torque on the satellite to adjust the attitude thereof.

18. The method of claim 17, wherein the ACS occupies a volume of less than 100 mm.times.100 mm.times.50 mm of the satellite and has a mass less than 500 grams, wherein a total power consumption of the ACS is less than 3 watts, wherein each of SGCMGs are configured to generate a torque of at least 0.75 Nmm.

* * * * *